United States Patent
Christinzio et al.

(10) Patent No.: US 12,359,548 B2
(45) Date of Patent: *Jul. 15, 2025

(54) ELECTRIC MOTOR DRIVEN TRANSPORTATION MECHANISMS FOR FRACTURING BLENDERS

(71) Applicant: U.S. Well Services, LLC, Houston, TX (US)

(72) Inventors: Alexander Christinzio, Houston, TX (US); Brandon Hinderliter, Houston, TX (US); Lon Robinson, Houston, TX (US); Jared Oehring, Houston, TX (US)

(73) Assignee: U.S. WELL SERVICES, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/424,562

(22) Filed: Jan. 26, 2024

(65) Prior Publication Data
US 2024/0167372 A1    May 23, 2024

Related U.S. Application Data

(63) Continuation of application No. 17/135,543, filed on Dec. 28, 2020, now Pat. No. 11,885,206.
(Continued)

(51) Int. Cl.
*E21B 43/26* (2006.01)
*B01F 27/232* (2022.01)
(Continued)

(52) U.S. Cl.
CPC ........ *E21B 43/2607* (2020.05); *B01F 27/232* (2022.01); *B01F 33/805* (2022.01); *B01F 35/71775* (2022.01)

(58) Field of Classification Search
CPC .. E04G 21/04; B28C 7/00; B28C 7/02; B28C 5/0875; B28C 9/04; B28C 7/0454;
(Continued)

(56) References Cited

U.S. PATENT DOCUMENTS

| | | | |
|---|---|---|---|
| 1,541,601 A | 6/1925 | Tribe | |
| 1,743,771 A | 1/1930 | Hall et al. | |

(Continued)

FOREIGN PATENT DOCUMENTS

| | | |
|---|---|---|
| CN | 104117308 A | 10/2014 |
| CN | 104196613 A | 12/2014 |

(Continued)

OTHER PUBLICATIONS

Shafto, "Growth in electric-fracking fleets stunted by tight producer budgets," S&P Global Market Intelligence, Aug. 6, 2019, 4 pages.

(Continued)

*Primary Examiner* — Charles Cooley
(74) *Attorney, Agent, or Firm* — Abel Schillinger, LLP

(57) ABSTRACT

A system for electric-motor driven transportation mechanism for fracturing operations is disclosed. The system includes at least one transportation mechanism to transport blender components for a blender fluid from a first tub that may be a proppant hopper to a second tub that may be a blender tub and that may be associated with a fracturing blender; an electric motor and a control unit associated with the at least one transportation mechanism; and at least one variable frequency drive (VFD) associated with the electric motors for real time control of a speed associated with the at least one transportation mechanism.

20 Claims, 8 Drawing Sheets

Related U.S. Application Data

(60) Provisional application No. 62/955,295, filed on Dec. 30, 2019.

(51) Int. Cl.
  *B01F 33/80* (2022.01)
  *B01F 35/71* (2022.01)

(58) Field of Classification Search
  CPC ..... B28C 7/044; B28C 9/0454; B28C 7/0418; B28C 7/0422; B28C 7/0477; B28C 7/10; B01F 15/0235; B01F 15/00538; B01F 15/00519; B01F 2215/0081; B01F 35/71731; B01F 35/32025; B01F 35/3204; B01F 2101/49; B01F 33/805; B01F 35/71775; B01F 27/232; F01D 15/08; F01D 15/10; F02C 3/22; F04B 49/20; F04B 19/22; F04B 17/03; F04B 17/06; F04B 23/00; F04B 47/02; F04B 49/065; H02P 23/00; E21B 43/267; E21B 43/26; E21B 43/2607; B65G 33/18; B65G 47/19; Y02P 70/10
  USPC .... 366/14–20, 27–29, 33–35, 64–66, 37–38, 366/31–32, 50–51, 41
  See application file for complete search history.

(56) References Cited

U.S. PATENT DOCUMENTS

| | | |
|---|---|---|
| 1,967,466 A | 7/1934 | Damsel |
| 2,237,812 A | 4/1941 | De Blieux et al. |
| 2,753,940 A | 7/1956 | Bonner |
| 2,852,600 A | 9/1958 | Jenkins, Jr. |
| 2,976,025 A | 3/1961 | Pro |
| 3,116,086 A | 12/1963 | Barengoltz |
| 3,347,570 A | 10/1967 | Roessler |
| 3,794,846 A | 2/1974 | Schlicher et al. |
| 3,878,884 A | 4/1975 | Raleigh |
| 3,967,841 A | 7/1976 | Kendrick et al. |
| 4,411,313 A | 10/1983 | Johnson et al. |
| 4,442,665 A | 4/1984 | Fick et al. |
| 4,538,916 A | 9/1985 | Zimmerman |
| 4,562,360 A | 12/1985 | Fujimoto |
| 4,601,629 A | 7/1986 | Zimmerman |
| 4,768,884 A | 9/1988 | Elkin |
| 4,783,038 A | 11/1988 | Gilbert et al. |
| 4,898,473 A | 2/1990 | Stegemoeller et al. |
| 5,114,239 A | 5/1992 | Allen |
| 5,293,947 A | 3/1994 | Stratton |
| 5,334,899 A | 8/1994 | Skybyk |
| 5,439,066 A | 8/1995 | Gipson |
| 5,486,047 A | 1/1996 | Zimmerman |
| 5,549,285 A | 8/1996 | Collins |
| 5,791,636 A | 8/1998 | Loziuk |
| 5,798,596 A | 8/1998 | Lordo |
| 5,813,455 A | 9/1998 | Pratt et al. |
| 5,894,888 A | 4/1999 | Wiemers et al. |
| 5,950,726 A | 9/1999 | Roberts |
| 6,035,265 A | 3/2000 | Dister et al. |
| 6,097,310 A | 8/2000 | Harrell et al. |
| 6,116,040 A | 9/2000 | Stark |
| 6,121,705 A | 9/2000 | Hoong |
| 6,273,193 B1 | 8/2001 | Hermann et al. |
| 6,315,523 B1 | 11/2001 | Mills |
| 6,406,011 B1 | 6/2002 | Kosar et al. |
| 6,442,942 B1 | 9/2002 | Kopko |
| 6,510,695 B1 | 1/2003 | Fisher |
| 6,585,455 B1 | 7/2003 | Petersen et al. |
| 6,633,727 B2 | 10/2003 | Henrie et al. |
| 6,788,022 B2 | 9/2004 | Sopko et al. |
| 6,808,303 B2 | 10/2004 | Fisher |
| 6,837,910 B1 | 1/2005 | Yoshikawa et al. |
| 6,985,750 B1 | 1/2006 | Vicknair et al. |
| 7,279,655 B2 | 10/2007 | Blutke et al. |
| 7,309,835 B2 | 12/2007 | Morrison et al. |
| 7,341,287 B2 | 3/2008 | Gibb et al. |
| 7,494,263 B2 | 2/2009 | Dykstra et al. |
| 7,717,193 B2 | 5/2010 | Egilsson et al. |
| 7,770,396 B2 | 8/2010 | Roby et al. |
| 7,795,830 B2 | 9/2010 | Johnson |
| 7,807,048 B2 | 10/2010 | Collette |
| 7,845,413 B2 | 12/2010 | Shampine et al. |
| 7,900,893 B2 | 3/2011 | Teurlay et al. |
| 8,146,665 B2 | 4/2012 | Neal |
| 8,221,513 B2 | 7/2012 | Ariyapadi et al. |
| 8,272,439 B2 | 9/2012 | Strickland |
| RE44,444 E | 8/2013 | Dole et al. |
| 8,556,302 B2 | 10/2013 | Dole |
| 8,774,972 B2 | 7/2014 | Rusnak et al. |
| 8,789,601 B2 | 7/2014 | Broussard et al. |
| 8,893,787 B2 | 11/2014 | Tips et al. |
| 8,905,056 B2 | 12/2014 | Kendrick |
| 8,997,904 B2 | 4/2015 | Cryer et al. |
| 9,062,545 B2 | 6/2015 | Roberts et al. |
| 9,140,105 B2 | 9/2015 | Pattillo |
| 9,140,110 B2 | 9/2015 | Coli et al. |
| 9,353,593 B1 | 5/2016 | Lu et al. |
| 9,410,410 B2 | 8/2016 | Broussard et al. |
| 9,450,385 B2 | 9/2016 | Kristensen |
| 9,475,840 B2 | 10/2016 | Lledó et al. |
| 9,506,333 B2 | 11/2016 | Castillo et al. |
| 9,611,728 B2 | 4/2017 | Oehring |
| 9,790,858 B2 | 10/2017 | Kanebako |
| 9,893,500 B2 | 2/2018 | Oehring et al. |
| 9,903,190 B2 | 2/2018 | Conrad et al. |
| 9,945,365 B2 | 4/2018 | Hernandez et al. |
| 9,970,278 B2 | 5/2018 | Broussard et al. |
| 10,020,711 B2 | 7/2018 | Oehring et al. |
| 10,119,381 B2 | 11/2018 | Oehring et al. |
| 10,221,639 B2 | 3/2019 | Romer et al. |
| 10,254,732 B2 | 4/2019 | Oehring et al. |
| 10,280,724 B2 | 5/2019 | Hinderliter |
| 10,302,079 B2 | 5/2019 | Kendrick |
| 10,337,308 B2 | 7/2019 | Broussard et al. |
| 10,408,030 B2 | 9/2019 | Oehring et al. |
| 10,408,031 B2 | 9/2019 | Oehring et al. |
| 10,415,332 B2 | 9/2019 | Morris et al. |
| 10,526,882 B2 | 1/2020 | Oehring et al. |
| 10,648,270 B2 | 5/2020 | Brunty et al. |
| 10,648,311 B2 | 5/2020 | Oehring et al. |
| 10,686,301 B2 | 6/2020 | Oehring et al. |
| 10,690,131 B2 | 6/2020 | Rashid et al. |
| 10,731,561 B2 | 8/2020 | Oehring et al. |
| 10,740,730 B2 | 8/2020 | Altamirano et al. |
| 10,767,561 B2 | 9/2020 | Brady |
| 10,781,752 B2 | 9/2020 | Kikkawa et al. |
| 10,794,165 B2 | 10/2020 | Fischer et al. |
| 10,837,270 B2 * | 11/2020 | Coli ................. B01F 35/75465 |
| 10,864,487 B1 * | 12/2020 | Han .................... B01F 35/3204 |
| 10,934,824 B2 | 3/2021 | Oehring et al. |
| 10,988,998 B2 | 4/2021 | Fischer et al. |
| 11,203,879 B2 | 12/2021 | DeGaray et al. |
| 11,885,206 B2 * | 1/2024 | Christinzio ....... B01F 35/71775 |
| 2001/0000996 A1 | 5/2001 | Grimland et al. |
| 2003/0057704 A1 | 3/2003 | Baten et al. |
| 2004/0045703 A1 | 3/2004 | Hooper et al. |
| 2004/0212679 A1 | 10/2004 | Jun |
| 2005/0116541 A1 | 6/2005 | Seiver |
| 2005/0201197 A1 | 9/2005 | Duell et al. |
| 2006/0109141 A1 | 5/2006 | Huang et al. |
| 2007/0125544 A1 | 6/2007 | Robinson et al. |
| 2007/0201305 A1 | 8/2007 | Heilman et al. |
| 2007/0226089 A1 | 9/2007 | DeGaray et al. |
| 2008/0094939 A1 * | 4/2008 | Wenger ................. B01F 27/703 366/601 |
| 2008/0142304 A1 | 6/2008 | Schutz et al. |
| 2008/0164023 A1 | 7/2008 | Dykstra et al. |
| 2008/0217024 A1 | 9/2008 | Moore |
| 2008/0236818 A1 | 10/2008 | Dykstra |
| 2008/0257449 A1 | 10/2008 | Weinstein et al. |
| 2008/0277120 A1 | 11/2008 | Hickie |
| 2009/0068031 A1 | 3/2009 | Gambier et al. |

(56) References Cited

U.S. PATENT DOCUMENTS

| | | |
|---|---|---|
| 2009/0072645 A1 | 3/2009 | Quere |
| 2009/0078410 A1 | 3/2009 | Krenek et al. |
| 2009/0114392 A1 | 5/2009 | Tolman et al. |
| 2009/0200290 A1 | 8/2009 | Cardinal et al. |
| 2009/0315297 A1 | 12/2009 | Nadeau et al. |
| 2010/0193057 A1 | 8/2010 | Garner et al. |
| 2010/0281876 A1 | 11/2010 | Khan et al. |
| 2011/0042387 A1 | 2/2011 | Henry et al. |
| 2011/0061855 A1 | 3/2011 | Case et al. |
| 2011/0063942 A1 | 3/2011 | Hagan et al. |
| 2011/0081268 A1 | 4/2011 | Ochoa et al. |
| 2011/0097988 A1 | 4/2011 | Lord |
| 2011/0110793 A1 | 5/2011 | Leugemores et al. |
| 2011/0175397 A1 | 7/2011 | Amrine, Jr. et al. |
| 2011/0197988 A1 | 8/2011 | Van Vliet et al. |
| 2011/0241590 A1 | 10/2011 | Horikoshi et al. |
| 2012/0063936 A1 | 3/2012 | Baxter et al. |
| 2012/0111560 A1 | 5/2012 | Hill et al. |
| 2012/0112757 A1 | 5/2012 | Vrankovic et al. |
| 2012/0150455 A1 | 6/2012 | Franklin et al. |
| 2012/0205400 A1 | 8/2012 | DeGaray et al. |
| 2012/0255734 A1 | 10/2012 | Coli et al. |
| 2013/0051971 A1 | 2/2013 | Wyse et al. |
| 2013/0078114 A1 | 3/2013 | Van Rijswick et al. |
| 2013/0138254 A1 | 5/2013 | Seals et al. |
| 2013/0199617 A1 | 8/2013 | DeGaray et al. |
| 2013/0284455 A1 | 10/2013 | Kajaria et al. |
| 2013/0306322 A1 | 11/2013 | Sanborn et al. |
| 2014/0077607 A1 | 3/2014 | Clarke et al. |
| 2014/0124162 A1 | 5/2014 | Leavitt |
| 2014/0138079 A1 | 5/2014 | Broussard et al. |
| 2014/0158345 A1 | 6/2014 | Jang et al. |
| 2014/0174717 A1 | 6/2014 | Broussard et al. |
| 2014/0251623 A1 | 9/2014 | Lestz et al. |
| 2014/0273128 A1 | 9/2014 | Coleman et al. |
| 2015/0038021 A1 | 2/2015 | Gilliam |
| 2015/0114652 A1 | 4/2015 | Lestz et al. |
| 2015/0144336 A1 | 5/2015 | Hardin et al. |
| 2015/0147194 A1 | 5/2015 | Foote |
| 2015/0233530 A1 | 8/2015 | Sandidge |
| 2015/0252661 A1 | 9/2015 | Glass |
| 2016/0006311 A1 | 1/2016 | Li |
| 2016/0032703 A1 | 2/2016 | Broussard et al. |
| 2016/0177678 A1 | 6/2016 | Morris et al. |
| 2016/0230660 A1 | 8/2016 | Zeitoun et al. |
| 2016/0258267 A1 | 9/2016 | Payne et al. |
| 2016/0319649 A1 | 11/2016 | Oehring |
| 2016/0326853 A1 | 11/2016 | Fredd et al. |
| 2016/0348479 A1 | 12/2016 | Oehring et al. |
| 2017/0028368 A1* | 2/2017 | Oehring ............. B01F 35/3204 |
| 2017/0082033 A1 | 3/2017 | Wu et al. |
| 2017/0096889 A1 | 4/2017 | Blanckaert et al. |
| 2017/0144831 A1* | 5/2017 | Hodgson ............ E21B 43/2607 |
| 2017/0204852 A1 | 7/2017 | Barnett, Jr. |
| 2017/0212535 A1 | 7/2017 | Shelman et al. |
| 2017/0222409 A1 | 8/2017 | Oehring et al. |
| 2017/0226842 A1 | 8/2017 | Omont et al. |
| 2017/0259227 A1* | 9/2017 | Morris ................. B01F 23/551 |
| 2017/0369258 A1 | 12/2017 | DeGaray et al. |
| 2017/0370639 A1 | 12/2017 | Bardon et al. |
| 2018/0090914 A1 | 3/2018 | Johnson et al. |
| 2018/0181830 A1 | 6/2018 | Luharuka et al. |
| 2018/0259080 A1 | 9/2018 | Dale et al. |
| 2018/0266217 A1 | 9/2018 | Funkhauser et al. |
| 2018/0284817 A1 | 10/2018 | Cook et al. |
| 2018/0298731 A1 | 10/2018 | Bishop |
| 2018/0312738 A1 | 11/2018 | Rutsch et al. |
| 2018/0313677 A1 | 11/2018 | Warren et al. |
| 2018/0347214 A1 | 12/2018 | DeGaray et al. |
| 2018/0363640 A1 | 12/2018 | Kajita et al. |
| 2018/0366950 A1 | 12/2018 | Pederson et al. |
| 2019/0010793 A1* | 1/2019 | Hinderliter ............... H02P 5/74 |
| 2019/0011066 A1 | 1/2019 | Ungchusri et al. |
| 2019/0040727 A1 | 2/2019 | Oehring et al. |
| 2019/0128104 A1 | 5/2019 | Graham et al. |
| 2019/0145251 A1 | 5/2019 | Johnson |
| 2019/0154020 A1 | 5/2019 | Glass |
| 2019/0249527 A1 | 8/2019 | Kraynek |
| 2019/0257462 A1 | 8/2019 | Rogers |
| 2020/0040878 A1 | 2/2020 | Morris |
| 2020/0325760 A1 | 10/2020 | Markham |
| 2020/0350790 A1 | 11/2020 | Luft et al. |
| 2021/0198994 A1* | 7/2021 | Christinzio ......... E21B 43/2607 |
| 2022/0297346 A1 | 9/2022 | Johnson |
| 2024/0167372 A1* | 5/2024 | Christinzio ........... B01F 27/232 |

FOREIGN PATENT DOCUMENTS

| | | |
|---|---|---|
| CN | 112196508 A | 1/2021 |
| WO | 0047893 A1 | 8/2000 |
| WO | 2007055587 A1 | 5/2007 |
| WO | 2009046280 A1 | 4/2009 |
| WO | 2012051705 A1 | 4/2012 |
| WO | 201411676 A1 | 7/2014 |
| WO | 2014105642 A1 | 7/2014 |
| WO | 2014177346 A1 | 11/2014 |
| WO | 2018044307 A1 | 3/2018 |
| WO | 2018213925 A1 | 11/2018 |
| WO | 2019210417 A1 | 11/2019 |

OTHER PUBLICATIONS

"Swivel Joint," Jereh, Yantal Jereh Petroleum Equipment & Technologies Co. Ltd., printed Dec. 1, 2022, 14 pages.

Camara, "Electrical Engineering Reference Manual for the Electrical and Computer PE Exam—Sixth Edition," Professional Publications, Inc., ISBN: 1-888577-56-8, 2002, 50 pages.

"Comprehensive Power, Power It up," Technical Presentation, Feb. 27, 2013 (available at: https://www.slideshare.net/jeffsable/comprehensive-power-introduction-oct2013?from_action=save), 28 pages.

"Comprehensive Power, Power It up," Technical Presentation, Oct. 3, 2013 (available at: https://www.slideshare.net/jeffsable/comprehensive-power-introduction-oct2013?from_action=save), 26 pages.

"American National Standard—Motors and Generators," ANSI/NEMA MG 1, 2011, 636 pages.

"IEEE Standard for Petroleum and Chemical Industry—Premium-Efficiency, Severe-Duty, Totally Enclosed Fan-Cooled (TEFC) Squirrel Cage Induction Motors—up to and Including 370 kW (500 hp)," IEEE, 2009, 32 pages.

Cary et al., "Electric Rotating Machine Standards Part II: Magnetic Wedge Design & Monitoring Methods," IEEE, Paper No. PCIC-2011-41, 2011, 8 pages.

Bogh et al., "A User's Guide to Factory Testing of Large Motors: What Should Your Witness Expect?," IEEE, Paper No. PCIC-, 2009, 8 pages.

Lockley et al., "What Do the API Motor/Generator Features Cost and What Do They Buy You?," IEEE, Paper No. PCIC-2010-22, 2010, 10 pages.

Malinowski et al., "Petrochemical standards a comparison between IEEE 841-2001, API 541 and API 547," IEEE, Paper No. PCIC-2004-22, 2004, 8 pages.

"Reinventing the Frac Fleet," Clean Fleet, WhisperFrac Reducing Noise and Vibrations, 2018, 2 pages.

"MEC's Mobile Electric Centers for Voltages up to 36kV," ABB, printed 2021, 2 pages.

"Prefabricated Electric Centers (PEC)—Mobile Electric Centers (MEC)," ABB, 2017, 14 pages.

"Mobile Substations on wheels," ABB, 2022, 4 pages.

"Benefits of Using Mobile Transformers and Mobile Substations for Rapidly Restoring Electrical Service," U.S. Department of Energy, Aug. 2006, 48 pages.

"The Evolution of the Modern Substation," Primera, 2022, 4 pages.

Hanna et al., "Medium-Voltage Adjustable-Speed Drives—Users' and Manufacturers' Experiences," IEEE Transactions on Industry Applications, vol. 33, No. 6, Nov./Dec. 1997, 9 pages.

(56) References Cited

OTHER PUBLICATIONS

"IEEE 100: The Authoritative Dictionary of IEEE Standards Terms, Seventh Edition," IEEE Press, 2000, ISBN: 0-7381-2601-2, 7 pages.
"Adjustable Speed Electrical Power Drive Systems—Part 4: General Requirements—Rating Specifications for A.C. Power Drive Systems Above 1000 V A.C. and Not Exceeding 35 KV," National Electrical Manufacturers Association (NEMA) Standards Publication ICS 61800-4, 2004, 139 pages.
Roe, "Practices and Procedures of Industrial Electrical Design," McGraw-Hill, 1972, ISBN: 0-07-053390-3, 17 pages.
Oehring et al., U.S. Appl. No. 62/242,173, 2015, 17 pages.
Samsung All-In-One Security System, Quick Start Guide Kit Model SDHC5100, printed 2022, 11 pages.
Amazon.com listing for Samsung SDH-C5100 16 Channel 720p HD DVR Video Security System, 2015, 2 pages.
Amazon.com listing for Amcrest ProHD Wireless IP Security Camera, 2015, 8 pages.
Amazon.com listing for Security & Surveillance Cameras, 2015, 6 pages.
Stewart, "Extracting the Digit!! Time for an ROV Electronics Shake-Up?," Kongsberg Simrad Ltd, UTI, 1997, 10 pages.
Martin et al., "Lessons Learned from 27 Years' Experience of Stimulation Vessel Design and Operation—a Case Study," SPE 166243, 2013, 12 pages.
Maddox, "Visualizing Production in Flowing Oil Wells," Halliburton Energy Services, SPWLA 37th Annual Logging Symposium, Jun. 16-19, 1996, 6 pages.
Cooper et al., "The First Purpose-Built Stimulation Vessel for North Sea Application," Dowell Schlumberger, Society of Petroleum Engineers of AIME, SPE 12993, 1984, 7 pages.
Talley, "Development of a Closed Circuit TV Borehole Probe," Design Engineering Laboratories, Inc., Contract H0308041, Sep. 1984, 22 pages.
Smith et al., "Fracture Width-Design vs. Measurement," Amoco Production Co., Society of Petroleum Engineers of AIME, SPE 10965, 1982, 9 pages.
Hurst et al., "Development and Application of 'Frac' Treatments in the Permian Basin," SPE 405-G, vol. 204, 1955, 8 pages.
Briggs, "Development of a Downhole Television Camera," Oceanographic Engineering Corporation, 1964, 1 page.
IPIECA About Us page, 2015, 1 page.
Appl et al., "A Viewing Lens for High Pressure Applications," Society of Petroleum Engineers of AIME, SPE-299, 1962, 7 pages.
Taylor, "Efficiency: Watchword of the Oil Industry," Financial Analysts Journal, 2018, 4 pages.
Pritchard, "U.S. Color Television Fundamentals: A Review," SMPTE Journal, Nov. 1977, vol. 86, 10 pages.
Moxastore website, listing for NPORTIA5250, 2015, 2 pages.
Moxastore website, About Us, 2015, 1 page.
Moxastore website, Homepage, 2015, 2 pages.
Moxastore website, listing for Moxa 802.11 Ethernet to Serial, 2016, 1 page.
Amazon.com listing for Global Cache iTach, IP to Serial with PoE (IP2SL-P) by Global Cach, 2014, 3 pages.
Amazon.com listing for SainSmart TCP/IP Ethernet to Serial RS232 RS485 Intelligent Communication Converter by SainSmart, 2014, 4 pages.
Amazon.com listing for TCP/IP Ethernet to Serial RS232 RS485 RS422 Converter by Atc, 2014, 2 pages.
Amazon.com listing for StarTech.com 1 Port RS232 Serial to IP Ethernet Converter (NETRS2321P) by StarTech, 2014, 4 pages.
Amazon.com listing for StarTech NETRS2321E 1 Port RS-232/422/485 Serial over IP Ethernet Device Server by StarTech, 2014, 4 pages.
OSHA-NIOSH Hazard Alert: Worker Exposure to Silica during Hydraulic Fracturing, U.S. Department of Labor, 2012, 15 pages.
Avallone et al., "Marks Standard Handbook for Mechanical Engineers 11th Edition," McGraw-Hill, 2007, 5 pages.
Fink, "Standard Handbook for Electrical Engineers," Thirteenth Edition, McGraw-Hill, ISBN: 0-07-020984-7, 7 pages (excerpts) (Part 1).
Arvani et al., "Design and Development of an Engineering Drilling Simulator and Application for Offshore Drilling for MODUs and Deepwater Environments," Society of Petroleum Engineers, SPE-170301-MS, 2014, 17 pages.
Davis, "Natural Gas Finding Niche in E-Fracking, but Diesel Still Rules," Natural Gas Intelligence, NGI, 2019, 9 pages.
Canadian Office Action issued in Canadian Application No. 3,094,768, dated Oct. 28, 2021.
Final Office Action issued in corresponding U.S. Appl. No. 16/404,283, dated Jan. 11, 2021.
Final Office Action issued in corresponding U.S. Appl. No. 16/458,696, dated Jan. 21, 2021.
Final Office Action issued in corresponding U.S. Appl. No. 16/597,014, dated Feb. 4, 2021.
Final Office Action issued in U.S. Appl. No. 16/356,263, dated Oct. 7, 2021.
International Search Report and Written Opinion issued in PCT Application No. PCT/US2020/053980, dated Dec. 14, 2020.
International Search Report and Written Opinion issued in PCT Application No. PCT/US2020/058899, dated Feb. 3, 2021.
International Search Report and Written Opinion issued in PCT Application No. PCT/US2020/058906, dated Feb. 2, 2021.
International Search Report and Written Opinion issued in PCT Application No. PCT/US2020/059834, dated Feb. 4, 2021.
International Search Report and Written Opinion issued in PCT Application No. PCT/US2020/066543, dated May 11, 2021.
International Search Report and Written Opinion issued in PCT Application No. PCT/US2020/067146, dated Mar. 29, 2021.
International Search Report and Written Opinion issued in PCT Application No. PCT/US2020/067523, dated Mar. 22, 2021.
International Search Report and Written Opinion issued in PCT Application No. PCT/US2020/067526, dated May 6, 2021.
International Search Report and Written Opinion issued in PCT Application No. PCT/US2020/067528, dated Mar. 19, 2021.
International Search Report and Written Opinion issued in PCT Application No. PCT/US2020/067608, dated Mar. 30, 2021.
Kroposki et al., "Making Microgrids Work," 6 IEEE Power and Energy Mag. 40, 41, 2008.
Morris et al., U.S. Appl. No. 62/526,869; Hydration-Blender Transport and Electric Power Distribution for Fracturing Operation; Jun. 28, 2018; USPTO; see entire document.
Non-Final Office Action issued in corresponding U.S. Appl. No. 14/881,525, dated Jul. 21, 2021.
Non-Final Office Action issued in corresponding U.S. Appl. No. 16/404,283, dated Jul. 21, 2021.
Non-Final Office Action issued in corresponding U.S. Appl. No. 16/522,043, dated Jan. 4, 2021.
Non-Final Office Action issued in corresponding U.S. Appl. No. 16/564,185, dated Jan. 29, 2021.
Non-Final Office Action issued in corresponding U.S. Appl. No. 16/871,928, dated Aug. 25, 2021.
Non-Final Office Action issued in corresponding U.S. Appl. No. 16/943,727, dated Aug. 3, 2021.
Non-Final Office Action issued in U.S. Appl. No. 16/901,774, dated Sep. 14, 2021.
Non-Final Office Action issued in U.S. Appl. No. 17/060,647, dated Sep. 20, 2021.
Non-Final Office Action issued in U.S. Appl. No. 16/564,186, dated Oct. 15, 2021.
Non-Final Office Action issued in U.S. Appl. No. 16/871,328, dated Dec. 9, 2021.
Non-Final Office Action issued in U.S. Appl. No. 16/943,935, dated Oct. 21, 2021.
Notice of Allowance issued in corresponding U.S. Appl. No. 15/829,419, dated Jul. 26, 2021.
Ton et al., "The U.S. Department of Energy's Microgrid Initiative," 25 The Electricity J. 84, 2012, pp. 84-94.
Woodbury et al., "Electric Design Considerations for Drilling Rigs," IEEE Transactions on Industry Applications, vol. 1A-12, No. 4, Jul./Aug. 1976, pp. 421-431.

(56) References Cited

OTHER PUBLICATIONS

Non-Final Office Action issued in U.S. Appl. No. 17/135,543, dated Jul. 8, 2022.
Final Office Action issued in U.S. Appl. No. 17/135,543, dated Mar. 31, 2023.
Notice of Allowance issued in U.S. Appl. No. 17/135,543, dated Sep. 28, 2023.
Mistry et al., "Induction Motor Vibrations in View of the API 541-4th edition," IEEE, Paper No. PCIC-, 2008, 10 pages.
Paschall et al., "Navigating the Test Requirements of API 541 4th Edition," IEEE, Paper No. PCIC-2007-11, 2007, 12 pages.
"G7 Adjustable Speed Drive Operation Manual," Toshiba, Document No. 51546-009, Mar. 2005, 221 pages.
"Weir SPM: General Catalog," Weir SPM, 2009, 40 pages.
Krueger, "Advances in Well Completion and Stimulation During JPT's First Quarter Century," Journal of Petroleum Technology, Dec. 1973, 16 pages.
Lietard et al., "Hydraulic Fracturing of Horizontal Wells: An Update of Design and Execution Guidelines," Society of Petroleum Engineers, SPE 37122, 1996, 15 pages.
Waters et al., "Simultaneous Hydraulic Fracturing of Adjacent Horizontal Wells in the Woodford Shale," Society of Petroleum Engineers, SPE 119635, 2009, 22 pages.
Bahadori et al., "Dictionary of Oil, Gas, and Petrochemical Processing," CRC Press, ISBN: 978-1-4665-8825-7, 2014, 8 pages.
"A Dictionary for the Oil and Gas Company—Second Edition," The University of Texas at Austin—Petroleum Extension Service, ISBN: 978-0-88698-240-9, 2011, 7 pages.
"Lessons Learned from Natural Gas STAR Partners: Reduced Emissions Completions for Hydraulically Fractured Natural Gas Wells," U.S. Environmental Protection Agency, 2011, 12 pages.
Kidnay et al., "Fundamentals of Natural Gas Processing—Second Edition," CRS Press, ISBN: 978-1-4200-8519-8, 2011, 19 pages (Part 1).
Kidnay et al., "Fundamentals of Natural Gas Processing—Second Edition," CRS Press, ISBN: 978-1-4200-8519-8, 2011, 17 pages (Part 2).
Kidnay et al., "Fundamentals of Natural Gas Processing—Second Edition," CRS Press, ISBN: 978-1-4200-8519-8, 2011, 12 pages (Part 3).
Listing at Amazon.com for Kidnay et al., "Fundamentals of Natural Gas Processing—Second Edition," CRS Press, ISBN: 978-1-4200-8519-8, Jul. 7, 2013, 4 pages.
Listing at Amazon.com for Kidnay et al., "Fundamentals of Natural Gas Processing—Second Edition," CRS Press, ISBN: 978-1-4200-8519-8, Feb. 22, 2015, 4 pages.
"Green Completions," IPIECA, Jan. 20, 2015, 7 pages.
"Sand Trap FAQ," Mountain Equipment of New Mexico, Inc., Jan. 8, 2014, 2 pages.
"Test Separators FAQ," Mountain Equipment of New Mexico, Inc., Jan. 8, 2014, 2 pages.
"Emergency Power Systems for Critical Facilities: A Best Practices Approach to Improving Reliability," FEMA, FEMA P-1019. Sep. 2014, 170 pages.
Persily et al., "Indoor Environmental Issues in Disaster Resilience," NIST Technical Note 1882, Jul. 2015, 40 pages.
"Precision Heat and Control Systems for Onshore Drilling and Production," Chromalox Precision Heat and Control, 2011, 6 pages.
"Zeus Electric Pumping Unit," Halliburton, printed 2021, 4 pages.
Nayyar, "Piping Handbook—Seventh Edition," Piping Handbook, 1999, 77 pages.
"Wire Rope Isolator Technologies," ITT Enidine, Inc., Mar. 29, 2014, Enidine, 78 pages.
Gardner Denver, Well Servicing Pump, Model GD-2500Q, GD-2500Q-HD, Quintuplex Pumps, Super GWS Fluid End (Uni-Flange) Parts List, 310FWF997 Revision A, Sep. 2011, 45 pages.
Wachel et al., "Analysis of Vibration and Failure Problems in Reciprocating Triplex Pumps for Oil Pipelines," The American Society of Mechanical Engineers, 1985, 8 pages.

"Flowline Products and Services—World Proven Chiksan and Weco Equipment," FMC Technologies, Mar. 28, 2015, 31 pages (Part 1).
"Flowline Products and Services—World Proven Chiksan and Weco Equipment," FMC Technologies, Mar. 28, 2015, 49 pages (Part 2).
"A complete line of swivel joints for drilling, production, and well servicing," Chiksan Original Swivel Joints, Nov. 1996, 16 pages.
"Worlds Best Swivel Joints," FlowValve, Jan. 17, 2015, available at https://web.archive.org/web/20150117041757/http://www.flowvalve.com/swivels, 10 pages.
"Victulic Couplings—Vibration Attenuation Characteristics," Victaulic Company, Oct. 2014, 5 pages.
Hudson et al., "Modeling Victaulic Couplings in Piping Stress Analysis Programs," Victaulic Company, WP-18 6685 Rev. B, Mar. 19, 2013, 19 pages.
"AGS Flexible Coupling Style W77," Victaulic, Apr. 23, 2015, available at: https://web.archive.org/web/20150423052817/http://www.victaulic.com/en/products-services/products/style-w77-ags-flexible-coupling/, 1 page.
"Advanced Groove System (AGS) Large Diameter Solutions." Victaulic, Apr. 19, 2015, available at: https://web.archive.org/web/20150419063052/http:/www.victaulic.com/en/businesses-solutions/solutions/advanced-groove-system/, 2 pages.
"Accommodating Seismic Movement," Victaulic, Apr. 12, 2015, available at https://web.archive.org/web/20150412042941/http:/www.victaulic.com/en/businesses-solutions/solutions/accommodating-seismic-movement/, 2 pages.
Saville, "The Victaulic Pipe Joint," Journal (American Water Works Association), Nov. 1922, vol. 9, No. 6, 8 pages.
Balaji et al., "Wire rope isolators for vibration isolation of equipment and structures," IP Conference Series: Materials Science and Engineering, 2015, 12 pages.
"FlowGuard Products," CoorsTek, Sep. 15, 2014 available at: https://web.archive.org/web/20140915230538/http://coorstek.com/resource-library/library/8510-1747-FlowGuard-Pulsation-Dampers.pdf, 8 pages.
"FlowGuard Pulsation Dampeners," CoorsTek, Feb. 23, 2015, available at: https://web.archive.org/web/20150223101630/http://www.coorstek.com/markets/energy_equipment/oil-gas/flowguard.php, 2 pages.
Morton, "Unlocking the Earth: A Short History of Hydraulic Fracturing," GEO ExPro, vol. 10, No. 6, Dec. 2013, 5 pages.
"Welcome to Stauff," Stauff, Aug. 5, 2013, 1 page.
"Stauff Clamps," Stauff, Aug. 7, 2013, 3 pages.
"Stauff Clamps, Heavy Series (DIN 3015-2)," Stauff, Aug. 30, 2013, 1 page.
"Heavy Series (DIN 3015-2)", Stauff, Product Literature, Nov. 3, 2013, 1 page.
"Heavy Series DIN 3015, Part 2," Stauff, Nov. 5, 2013, 24 pages.
Harris et al., "Harris' Shock and Vibration Handbook—Fifth Edition," McGraw-Hill Handbooks, 2002 [excerpted], 22 pages.
"Mark's Standard Handbook for Mechanical Engineers, 11th Edition," McGraw-Hill, ISBN 0-07-142867-4, 2007 [excerpted], 1 page.
Mallik et al., "On the Modelling of Non-Linear Elastomeric Vibration Isolators," Journal of Sound and Vibration, 1999, 219(2), 15 pages.
Malcius, "Mathematical model evaluation and parameter identification of pipe holder element," Journal of Vibroengineering, Jun. 2013, vol. 15, Issue 2, ISSN 1392-8716, 9 pages.
Wachel et al., "Piping Vibration Analysis," Engineering Dynamics, Incorporated, Proceedings of the Nineteenth Turbomachinery Symposium, 1990, 16 pages.
Fink, "Standard Handbook for Electrical Engineers," Thirteenth Edition, McGraw-Hill, ISBN: 0-07-020984-7, 7 pages (excerpts) (Part 2).
Fink, "Standard Handbook for Electrical Engineers," Thirteenth Edition, McGraw-Hill, ISBN: 0-07-020984-7, 6 pages (excerpts) (Part 3).
Roe, "Practices and Procedures of Industrial Electrical Design," McGraw-Hill, 1972, ISBN: 0-07-053390-3, 14 pages (Part 1).
Roe, "Practices and Procedures of Industrial Electrical Design," McGraw-Hill, 1972, ISBN: 0-07-053390-3, 11 pages (Part 2).

(56) References Cited

OTHER PUBLICATIONS

Camara, "Electrical Engineering Reference Manual for the Electrical and Computer PE Exam—Sixth Edition," Professional Publications, Inc., ISBN: 1-888577-56-8, 2002, 17 pages (Part 1).
Camara, "Electrical Engineering Reference Manual for the Electrical and Computer PE Exam—Sixth Edition," Professional Publications, Inc., ISBN: 1-888577-56-8, 2002, 25 pages (Part 2).
Camara, "Electrical Engineering Reference Manual for the Electrical and Computer PE Exam—Sixth Edition," Professional Publications, Inc., ISBN: 1-888577-56-8, 2002, 20 pages (Part 3).
Camara, "Electrical Engineering Reference Manual for the Electrical and Computer PE Exam—Sixth Edition," Professional Publications, Inc., ISBN: 1-888577-56-8, 2002, 19 pages (Part 4).
Camara, "Electrical Engineering Reference Manual for the Electrical and Computer PE Exam—Sixth Edition," Professional Publications, Inc., ISBN: 1-888577-56-8, 2002, 21 pages (Part 5).
PPI Course Catalog, 2004, available at: https://web.archive.org/web/20040220012405/http://ppi2pass.com/catalog/servlet/MyPpi_fl_corner-catalog.pdf, 16 pages.
"Teaching an Electrical and Computer Engineering PE Exam Review Course," PPI, 2003, available at: https://web.archive.org/web/20031223100101/http://ppi2pass.com/catalog/servlet/MyPpi_pg_corner-teachee.html, 2 pages.
"Instructors Corner," PPI, 2003, available at: https://web.archive.org/web/20031219232547/http://ppi2pass.com/catalog/servlet/MyPpi_pg_corner-corner.html, 2 pages.
EE-Reference Online Index, 2004, available at: https://web.archive.org/web/20040731020344/http://ppi2pass.com/catalog/servlet/MyPpi_fl_indices-EERMindex.pdf, 41 pages.
EE-Reference Online Introduction, 2004, available at: https://web.archive.org/web/20041013101643/http://ppi2pass.com/catalog/servlet/MyPpi_fl_indices-EERMIntro.pdf, 12 pages.
"Electrical PE Exam Review Products," PPI Online Catalog, 2004, available at: https://web.archive.org/web/20040214233851/http://ppi2pass.com/catalog/servlet/MyPpi_ct_ELECTRICAL, 7 pages.
"The PPI Online Catalog," 2004, available at: https://web.archive.org/web/20040215142016/http://ppi2pass.com/catalog/servlet/MyPpi_ct_MAIN, 2 pages.
Homepage of Professional Publications, Inc., 2004, available at: https://web.archive.org/web/20040209054901/http:/ppi2pass.com/catalog/servlet/MyPpi, 1 page.
"What PPI Customers Say," 2003), available at: https://web.archive.org/web/20031226130924/http://ppi2pass.com/catalog/servlet/MyPpi_pg_comments-EEcomments.html, 2 pages.
"About PPI," 2003, available at: https://web.archive.org/web/20031219231426/http://ppi2pass.com:80/catalog/servlet/MyPpi_pg_aboutppi.html, 1 page.
Amazon.com listing of EE-Reference, 2007, available at: https://web.archive.org/web/20070103124447/https://www.amazon.com/Electrical-Engineering-Reference-Manual-Computer/dp/1888577568/, 7 pages.
Hampton, "Low-cost fracking offers boon to oil producers, headaches for suppliers," Reuters, Sep. 12, 2019, https://www.reuters.com/article/us-usa-oil-electric-fracturing-focus/low-cost-fracking-offers-boon-to-oil-producers-headaches-for-supplies, 11 page.
"All Electric Fracturing—Reducing Emissions and Cost," 2021, H013770, 6 pages.
Abbott et al., "Crippling the Innovation Economy: Regulatory Overreach at the Patent Office," Regulatory Transparency Project of the Federalist Society, Aug. 14, 2017, 35 pages.
"Hydraulic Fracturing Techbook," Hartenergy, 2015, 9 pages.
"Petroleum Alumnus and Team Development Mobile Fracturing Unit that Alleviates Environmental Impact," LSU College of Engineering, 2021, 2 pages.
"Clean Fleet Reduces Emissions by 99% at Hydraulic Fracturing Sites," FluidPower Journal, 2019, 5 pages.
Deuster, "Game-changing hydraulic fracturing technology, reduces emissions by 99%," Intrado GlobeNewswire, Oct. 1, 2014, 4 pages.
"Halliburton Delivers Successful Grid-Powered Frac Operation", Halliburton News Release, Jan. 14, 2021, 4 pages.
Wang et al., "Development in the Limited-Entry Completion Fracturing Technique," SPE 17834, 1988, 13 pages.
Holden III et al., "Successful Stimulation of Fordoche Field With a Retarded HF Acid," Society of Petroleum Engineers of AIME, Aug. 1981, 6 pages.
Milligan, "Sour Gas Well Completion Practices in the Foothills," Society of Petroleum Engineers of AIME, Sep. 1982, 12 pages.
Beck et al., "Reservoir Evaluation of Fractured Cretaceous Carbonates in South Texas," SPWLA Eighteenth Annual Logging Symposium, Jun. 5-8, 1977, 25 pages.
Webster, "Current Completion Practices in Tight Reservoirs," Society of Petroleum Engineers, SPE 6379, 1977, 8 pages.
Bielstein, "Wire-Line Methods and Equipment," Humble Oil and Refining Company, Apr. 2, 1967, 16 pages.
"Form-wound Squirrel-Cage Induction Motors—500 Horsepower and Larger," ANSI/API Standard, 541-2003, Fourth Edition, Jun. 2004, 88 pages.
Gardner Denver, "Well Servicing Pump, Model GD-2500Q, Quintuplex, Operating and Service Manual," 300FWF996 Revision C, Aug. 2005, 46 pages.
"Standard Specification for Steel Bars, Carbon and Alloy, Hot-Wrought, General Requirements for," ASTM Int;l, A 29/A 29M-05, 2005, 16 pages.
"Variable Speed Pumping: A Guide to Successful Applications," Elsevier 2004, ISBN 1-85617-449-2, 2004, 186 pages.
Bonnett et al., "Squirrel Cage Rotor Options for A.C. Induction Motors," IEEE, 2000, 14 pages.
Bonnett, "Root Cause Failure Analysis for AC Induction Motors in the Petroleum and Chemical Industry," IEEE, Paper No. PCIC-2010-43, 2010, 13 pages.
"Mark's Standard Handbook for Mechanical Engineers, 11th Edition," McGraw-Hill, ISBN 0-07-142867-4, 2006, 11 pages.
"Standard Handbook for Electrical Engineers," Thirteenth Edition, McGraw-Hill, ISBN 0-07-020984-7, 1993, 9 pages (Part 1).
"Standard Handbook for Electrical Engineers," Thirteenth Edition, McGraw-Hill, ISBN 0-07-020984-7, 1993, 7 pages (Part 2).
"Standard Handbook for Electrical Engineers," Thirteenth Edition, McGraw-Hill, ISBN 0-07-020984-7, 1993, 6 pages (Part 3).
"112 IEEE Standard Test Procedure for Polyphase Induction Motors and Generators," IEEE Power Engineering Society, IEEE Std 112, 2004, 42 pages (Part 1).
"112 IEEE Standard Test Procedure for Polyphase Induction Motors and Generators," IEEE Power Engineering Society, IEEE Std 112, 2004, 45 pages (Part 2).
Hodowanec et al., "Introduction to API Standard 541, 4th Edition—Form-Wound Squirrel Cage Induction Motors—Larger than 500 Horsepower," IEEE, Paper No. PCIC-2003-33, 2003, 9 pages.
Rahill et al., "Sorting Out the Overlap," IEEE Industry Applications Magazine, vol. 15, No. 1, Jan.-Feb. 2009, 12 pages.
"Manufacturers of Cushioned Clamping, Quick Coupling & Support Systems," ZSI Beta Clamps, ZSI, Inc., Apr. 29, 2015, 2 pages.
Meikrantz et al., "Advances in Liquid/Liquid Centrifuge Design Provide New Options for Petroleum Production," Society of Petroleum Engineers, SPE 56709, 1999, 4 pages.

\* cited by examiner

ELECTRIC MOTOR DRIVEN TRANSPORTATION MECHANISMS FOR FRACTURING BLENDERS

CROSS-REFERENCE TO RELATED APPLICATION

The present application is a continuation of U.S. patent application Ser. No. 17/135,543 filed Dec. 28, 2020 titled ELECTRIC MOTOR DRIVEN TRANSPORTATION MECHANISMS FOR FRACTURING BLENDERS, now U.S. Pat. No. 11,885,206 issued Jan. 30, 2024, which claims the benefit of priority to U.S. Provisional Patent Application No. 62/955,295 filed Dec. 30, 2019 titled ELECTRIC MOTOR DRIVEN AUGERS FOR FRACTURING BLENDERS, the entire disclosures of which are incorporated by reference herein for all intents and purposes.

BACKGROUND

Field of Invention

In at least one embodiment, the present disclosure relates to hydraulic fracturing. In at least one embodiment, a system having electric motor driven augers for fracturing blenders in hydraulic fracturing operation is disclosed.

Related Technology

Fracturing, such as hydraulic fracturing, stimulates production from hydrocarbon producing wells. Such a process may utilize mobile systems for injection fluid into wellbores at pressures that are determined to provide subterranean fissures in areas around wellbores. A fracturing process may also rely on a fracturing fluid slurry that has been pressurized using high pressure pumps. As a fracturing process may include mobility requirements, high pressure pumps are required to be mounted on mobile surfaces of a fracturing fleet—such as, on skids, on truck-beds, and on trailers. Moreover, high pressure pumps may be powered by mobile power sources, such as by diesel engines. However, fracturing equipment components, such as the high-pressure pumps and associated power sources are required to have large volumes and masses to support hydraulic fracturing pumps that draw low pressure fluid slurry at approximately 100 pounds per square inch (psi). The discharge of the same fluid slurry may be required to be at high pressures of up to 15,000 psi or more. A single tub associated with fluid slurry may be mounted on a trailer, skid, or body load.

A fracturing fluid blender may be provided in a fracturing fleet for blending components of a hydraulic fracturing fluid. Blended components are supplied to the high-pressure pumps. Blending components that are fluid or liquid, such as chemicals, water, and acid may be supplied via fluid lines from respective sources. Blending components that are solid, such as mud or sand are supplied via a conveyor belt or augers. While a fracturing fluid blender (or fracturing blender) may be provided in a mobile unit, blending operations itself occurs in a blending tub of a fracturing fluid blender. Augers or a conveyer belt may be hydraulic-based systems having one or more of hydraulic fluid, pumps, motors, filters, and plumbing that may be subject to operational failures.

SUMMARY

In at least one embodiment, an improvement to address the above-described issues is described. In at least one embodiment, a system for an electric-motor driven transportation mechanism in a fracturing blender is disclosed. In at least one embodiment, a system for a fracturing blender includes a transportation mechanism to transport blender components for a blender fluid from a first tub that may be a proppant hopper to a second tub that may be a blender tub of a fracturing blender. In at least one embodiment, an electric motor and a control unit are associated with an electric-motor transportation mechanism. In at least one embodiment, one or more variable frequency drives (VFDs) may be integrated within electric motors to provide for real-time control of a speed associated with an electric-motor transportation mechanism.

In at least one embodiment, a system for blending in fracturing operations includes at least one transportation mechanism to transport blending components from a first tub to a second tub. In at least one embodiment, a second tub enables blending operations as part of a fracturing blender. In at least one embodiment, an electric motor and a control unit are associated with at least one transportation mechanism. In at least one embodiment, at least one variable frequency drive (VFD) is associated with an electric motor and a control unit so that the at least one VFD enables real-time control of a speed associated with the at least one transportation mechanism.

In at least one embodiment, a method for blending in fracturing operations includes associating at least one transportation mechanism with a first tub and a second tub. In at least one embodiment, at least one transportation mechanism is adapted to transport blending components from a first tub to a second tub for enabling blending operations. In at least one embodiment, a method includes enabling an electric motor and a control unit to cause movement associated with at least one transportation mechanism. At least one variable frequency drive (VFD) is associated with an electric motor and a control unit, and the at least one VFD is enabled to provide real-time control of a speed associated with movement caused in at least one transportation mechanism associated with the electric motor.

BRIEF DESCRIPTION OF THE DRAWINGS

Various embodiments in accordance with the present disclosure will be described with reference to the drawings, in which.

DETAILED DESCRIPTION

Figure 1:
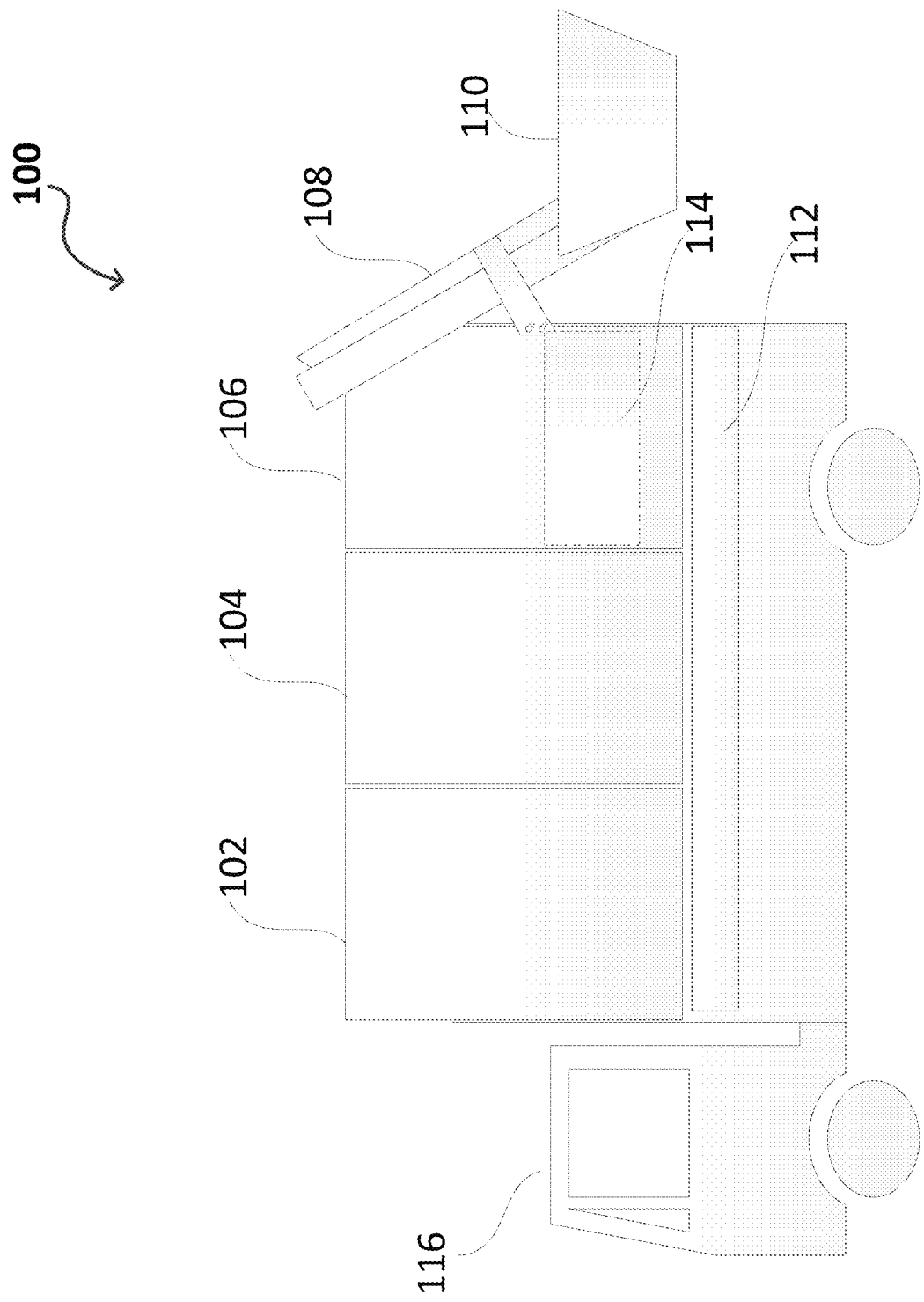
FIG. 1 illustrates an example system of a fracturing fluid blender subject to improvements of the present disclosure, in accordance with at least one embodiment herein.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The present system and method address the above complexities and deficiencies in a fracturing fluid blender (also referred to as fracturing blender) that is fed by hydraulic-based transportation mechanisms.

In hydraulic fracturing, proppant (such as sand or other synthetic media) may be pumped into a well bore, as a main component, to help allow hydrocarbons to flow to an external surface during production of a well. In at least one embodiment, proppant may be mixed in a blender or other system and may be delivered as a slurry to fracturing pumps for pumping into a well bore. In at least one embodiment, proppant may be transported to a proppant hopper using a transportation process such as by a truck or conveyer delivery system. In at least one embodiment, a present electric motor and associated VFD configuration may be used with a conveyer delivery system to bring proppant to a proppant hopper. Once in the proppant hopper, proppant may be moved to a blender tub at a predetermined concentration or predetermined rate, in accordance with at least one embodiment. Delivery of the proppant from a proppant hopper to a blender tub may be performed using a transportation mechanism, including augers, screws, or conveyers. A person of ordinary skill reading the present disclosure will be able to apply the present aspects to other transportation mechanisms than non-limiting examples provided herein.

In at least one embodiment, a transportation mechanisms, when driven by hydraulic motors may be susceptible to failure due to many hydraulic components required to support such a system. In addition, in an event of a failure, hydraulic fluid may also negatively impact an environment of a fracking operation, such as by a spill of the hydraulic fluid that may seep into the ground surrounding a fracturing operation.

Aspects of the present disclosure can provide specific control to a transportation mechanism for a fracturing fluid blender by using one or more electric motors with at least one VFD to turn an appropriate mechanical component of the transportation mechanism. In at least one embodiment, when auger(s) are used to deliver proppant from a proppant hopper to a blender tub, one or more electric motors may be controlled by an associated VFD to advance a transportation mechanism in a limited manner between a proppant hopper and a blender tub. In at least one embodiment, movement of a transportation mechanism consequently delivers proppant in predetermined or controlled amounts or concentrations.

In at least one embodiment, electric motors are adapted with an associated VFD feature to control their speeds precisely. In at least one embodiment, a number of augers and a size of the augers for such a process may be predetermined to an intended application or proppant used. An auger or a screw transportation mechanism may be used with an electric motor, in accordance with at least an embodiment, but a conveyer having appropriately sized buckets, paddles, or scoops may be used, In at least one embodiment, a conveyer may be used in an alternative embodiment for carrying proppant into a blender tub from a hopper. In addition, a proppant hopper may be designed to more efficiently support an electric motor transportation mechanism for delivery of proppant. FIGS. 2-4E cover aspects of such proppant hopper design, as well as a placement of electric motor(s) and at least one blender tub to support precise delivery of proppant to the blender tub.

FIG. 1 illustrates an example system 100 of a fracturing fluid blender subject to improvements of the present disclosure, in accordance with at least one embodiment. System 100 may be a fracturing fluid blender on a mobile unit 116, and the mobile unit 116 is part of a fracturing fleet. A fracturing fluid blender may include a mechanical unit 102, a control unit 104, and a blending unit 106. The blending unit 106 may be supported by augers, conveyors, or other transportation mechanisms 108 and by a blender tub 114 as well as proppant hopper 110. An additional control unit 112 (referred to as a fluid and solid control unit) may include valves and tank components to buffer or provide the solid or fluid components for blending in the blender tub 114.

In at least one embodiment, a mechanical unit 102 may include high- and low-pressure pumps. In at least one embodiment, one or more of the pumps, valves, and tank components may be external to the fracturing fluid blender. In at least one embodiment, sand may be transferred from an external holding area or tank to the blender tub 114 directly or through the augers or the other transporting mechanisms 108. In an example, the proppant hopper 110 may be used as a tank or may be used as an intermediate storage from the external holding area. Another type of transportation mechanism 108 includes drop-tanks. Further, while FIG. 1 illustrates sections 102-106 as rectangular modules, a person of ordinary skill reading the present disclosure will readily understand that specific components for a mechanical unit, such as pumps, motors, drive trains, etc.; for the control unit, such as sensors, screens, man-machine interfaces, etc.; and for the blending unit, such as valves, directors, protectors, etc., may be used in application with a fracturing fluid blender presently disclosed.

Figure 2:
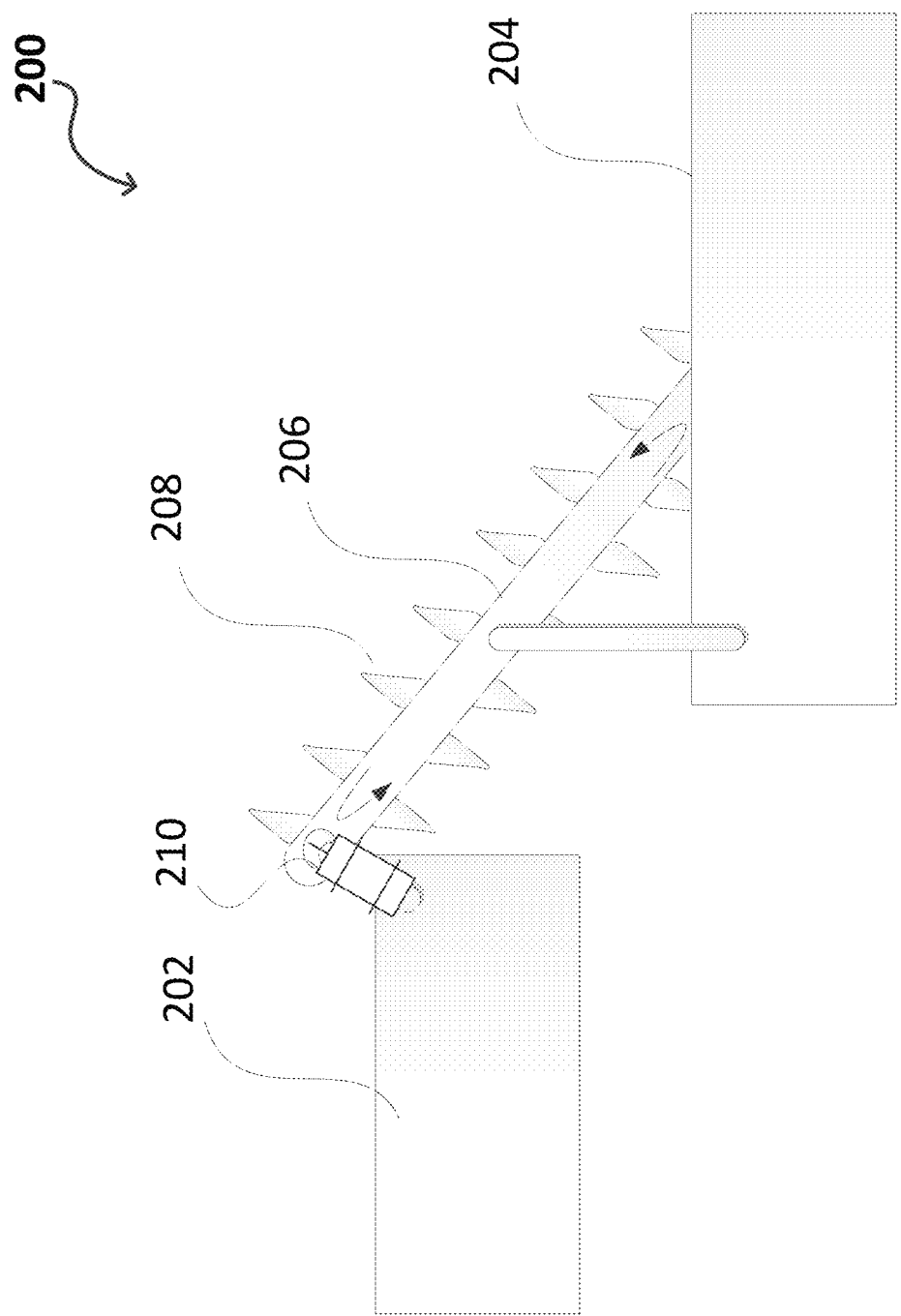
FIG. 2 illustrates a side view of system having a blender tub fed by a conveyer belt-type transportation mechanism that is operated by one or more electric motors in accordance with at least one embodiment herein.

FIG. 2 illustrates a side view of a system 200 having a blender tub 202 fed by a conveyer belt-type transportation mechanism 206 that is operated by one or more electric motors 210 in accordance with at least one embodiment of the present disclosure. In FIG. 2, proppant hopper 204 is provided with proppant for blending with one or more other components in the blender tub 202. In at least one embodiment, proppant hopper 204, blender tub 202, one or more electric motors 210, and a conveyor-belt type transportation mechanism 206 are all part of a mobile unit. In at least one embodiment, a conveyor-belt type transportation mechanism 206 has (as illustrated) a belt with appropriately sized buckets, paddles, or scoops 208, may be operated by at least one electric motor 210 for carrying proppant into a blender tub 202.

In at least one embodiment, a second electric motor may be at a second pulley on a lower part of a transportation mechanism 206 and has associated gears to balance torque requirements to move the transportation mechanism 206. In at least one embodiment, in a similar manner, an electric motor 210 may be also associated with a first pulley and associated gears at a top part of a transportation mechanism 206 to additionally move the transportation mechanism 206. In at least one embodiment, pulleys may be axles, wheels, sheaves, or other readily understood features capable of supporting belt or other transportation mechanisms used in the manner presently described. In at least one embodiment, a belt of a transportation mechanism 206 may be adapted to be within a proppant hopper 204 to enable proper and complete access to proppant therein. Further, the belt may be movable by a further motor or by gravity to be lowered or moved deeper into the proppant hopper 204 as the proppant level decreases within the proppant hopper 204. In at least one embodiment, therefore, at least one transportation mechanism 206 is movable into a proppant hopper 204 to access the blending components.

Figure 3A:
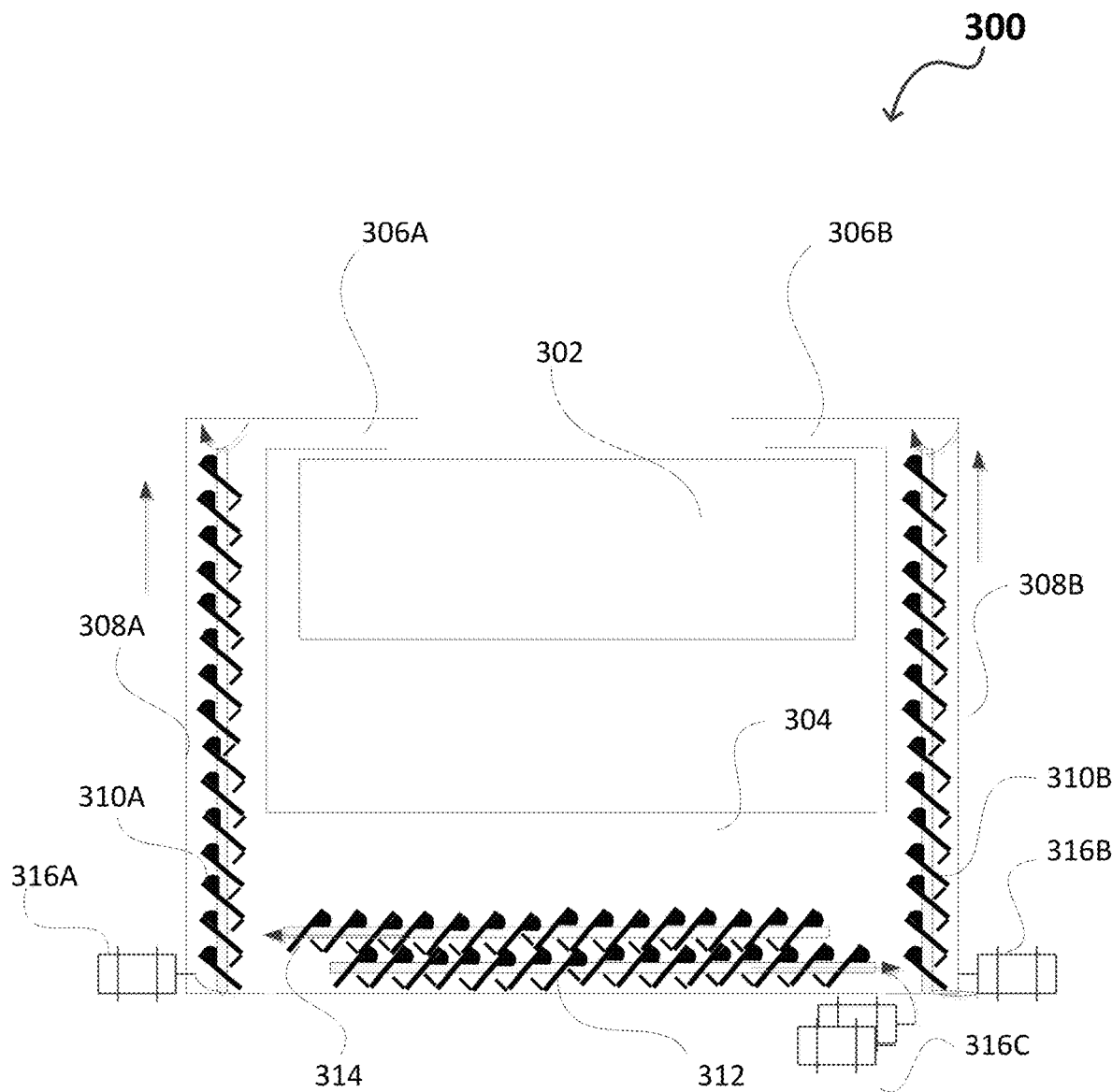
FIGS. 3A, 3B, 3C illustrate a system in various views of one or more augers working in concert by operation of one or more electric motors to feed a blender tub from at least a hopper, in accordance with at least one embodiment herein.
Figure 3B:
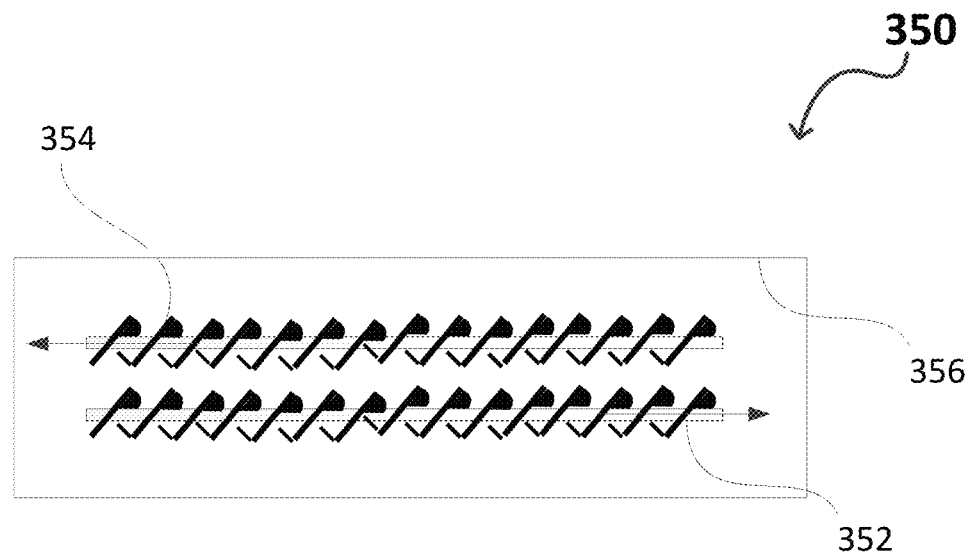
Figure 3C:
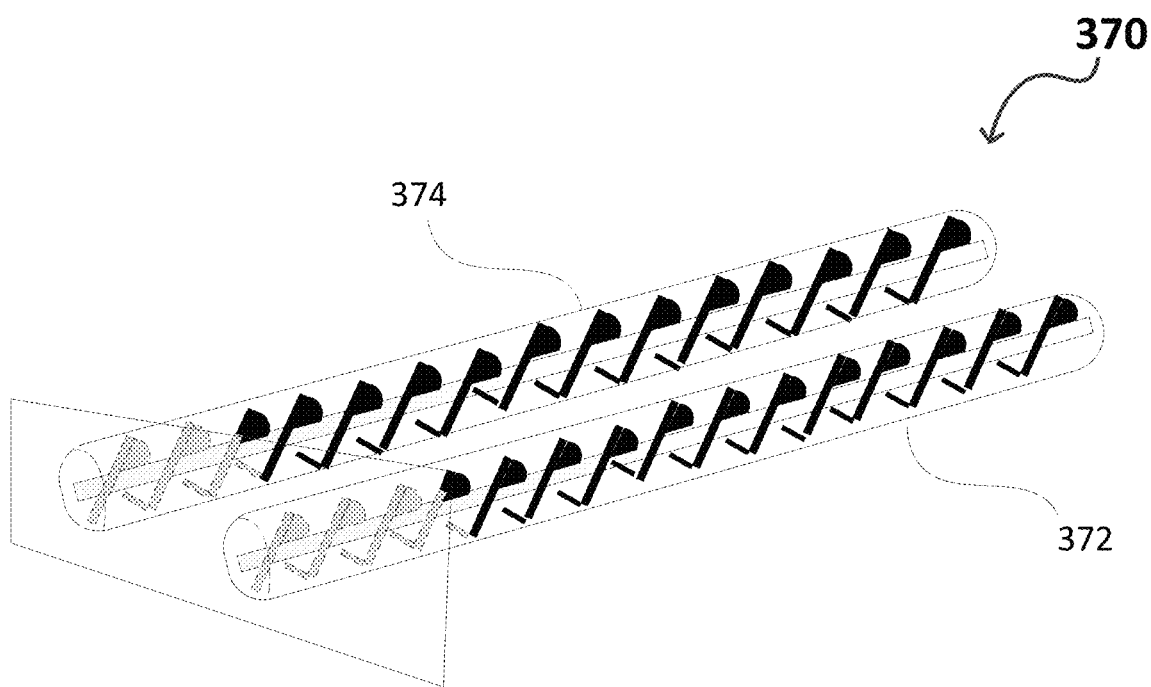

FIGS. 3A, 3B, 3C illustrate a system 300, in various views, of one or more augers 310A, 310B, 312, 314 working in concert by operation of one or more electric motors 316A-C to feed a blender tub 302 from at least a proppant hopper 304 in accordance with at least one embodiment of the present disclosure. In a system 300, base augers 312, 314 (also 352, 354 of plan view 350 in FIG. 3C and 372, 374 of perspective view 370 in FIG. 3C) are located under proppant or at a bottom of a proppant hopper 304. In at least one embodiment, base augers 312, 314 work in concert to funnel or move proppant outwards to side or support augers 310A, B that may be located on each side of a proppant hopper 304. In at least one embodiment, an arrangement, as in FIGS. 3A-3C, allows for access to bearings of provided augers that may need replacement as proppant load may demand over time.

In at least one embodiment, features described above with base and side augers enable provision of two transportation mechanisms, such as two augers. In at least one embodiment, a first one of the two transportation mechanisms are aligned in a first angle with respect to a bottom of the first tub, such as one of side or support augers 310A, 310B. In at least one embodiment, a second one of two transportation mechanisms may be provided in a second angle with respect to a first angle of a first one of the two transportation mechanisms, such as one of base augers 312, 314 being perpendicular to side or support augers 310A, 310B provided in example system 300.

In at least one embodiment, vertical sections 308A, B may be provided as part of a proppant hopper 304 or may be separate chutes that host side augers 310A, B and that support funneling of proppant to a blender tub 302. Delivery areas 306A, B may be part of vertical sections 308A, B provided or may be part of a proppant hopper 304 and may be adapted to deliver proppant to appropriate areas in a blender tub 302. In at least one embodiment, delivery areas 306A, B provided are optional, and instead, vertical sections 308A, B provided may be adapted to enter a blender tub 302 so that proppant may be pushed into a blender tub 302 from any appropriate direction.

In at least one embodiment, a provided section 308A; B may not be vertical but may be angled in any manner to support augers 310A, B, to move proppant with specific control from electric motors 316A, B provided. In at least one embodiment, electric motors 316A, B, C that are provided may be controlled in a synchronous manner so that proppant is continuously moving and does not accumulate in any areas within a proppant hopper 304, within a vertical section 308A, B or within provided delivery areas 306A, B. In at least one embodiment, control to electric motors 316A-C may be from a control section (such as control section 104) of a mobile unit hosting a fracturing fluid blender with electric motors and at least one VFD component.

In at least one embodiment, a control section 104 includes a control unit and is remotely located from an electric motor (and an associated VFD) but is able to provide input to control the at least one VFD, which in turn outputs control signals to an electric motor 316A; B; and C to control a speed of an associated transportation mechanism. In at least one embodiment, by at least their distinct locations, it is understood that a control section 104, on a mobile unit 116, may be remotely located from an electric motor by can communicate input to a VFD for providing control signals to an electric motor. In at least one embodiment, control signals include power are an appropriate voltage, current, and frequency to cause a determined frequency or speed of movement of an associated transportation mechanism. In at least one embodiment, in a manner described with respect to at least FIG. 2, electric motors 316A-C may be associated with respective gears to cause torque within one or more transportation mechanism 310A, B, 312, 314.

FIGS. 4A, 4B, 4C, 4D, and 4E illustrate a system 400; 450; 470; 480; 490 in various views with further detail of one or more augers 404; 454 working in concert, by operation of one or more electric motors 406; 456, to feed a blender tub 408; 458 from at least a hopper 402; 452, in accordance with at least one embodiment. In at least one embodiment, each of a system 400; 450; 470; 480; 490 illustrated may be used interchangeably or in a combination to achieve VFD associated-control with an electric motor and a control unit that supports real-time control of a speed associated with the at least one transportation mechanism. Proppant may be placed in a proppant hopper 402; 452 from an external source or may be already present in a proppant hopper 402; 452. In at least one embodiment, a mobile unit hosting system 400; 450, may be brought on site with a loaded proppant hopper 402; 452. In at least one embodiment, blending operations may be performed on-site. In at least one embodiment, one or more augers 404; 454 are referenced, but are understood in the illustration to be within shielding or angled sections to limit external influence on the proppant or to limit external influence by proppant during movement caused by one or more augers. In at least one embodiment, the augers may be exposed in a semi-covered section.

In at least one embodiment, a system 400; 450 removes any risk from hydraulic fluid-related issues, such as possibility of spills that may occur should a hydraulic-based transportation mechanism be used. Further, provided electric motors 406; 456 may also support specific or precise movements so that delivery of proppant according to predetermined concentrations may be more accurately achieved and so that wastage of components to be used for blender fluid may be reduced. In at least one embodiment, automation of a proppant hopper 402; 452 and of one or more augers 404; 454 may be enabled by use of electric motors and associated VFD to further reduce risk and issues associated with hydraulic-based systems. In at least one embodiment, one or more sensors may be used to detect levels of proppant in a proppant hopper 402; 452; to detect an auger speed of one or more augers 404; 454; and to detect a proppant size. From this information, in at least one embodiment, speed of a transportation mechanism may be controlled to avoid overfilling and underfilling of a blender tub, and to avoid damage to a transportation mechanism, for instance.

In at least one embodiment, system 400; 450 therefore describe at least one transportation mechanism 404; 454 and deliver channel 412; 462 to transport blending components from a first tub 402; 452 to a second tub 408; 458, where the second tub is provided to enable blending operations. In at least one embodiment, blending operations occur in a fracturing fluid blender 410; 460 that includes a second tub 408; 458 and associated blending equipment, such as a blending motor. In at least one embodiment, a fracturing fluid blender includes blending motors and other assembly to mix together proppant and other fracturing components to be blended. In at least one embodiment, an electric motor 406; 456 and a control unit 104 (FIG. 1) may be associated with at least one transportation mechanism 404; 454. In at least one embodiment, at least one variable frequency drive (VFD) may be associated with the electric motor and the control unit, and the at least one VFD may be adapted to enable real-time control of a speed associated with at least one transportation mechanism.

In at least one embodiment, a control unit 104 (in FIG. 1) may send an instruction to a VFD 406A; 456A that may be incorporated within a shell of an electric motor 406; 456 or that may be separate from an electric motor 406; 456. In at least one embodiment, a VFD 406A; 456A may be understood to change a speed of an electric motor 406; 456 by varying a frequency of a power applied to the electric motor. In at least one embodiment, a 60 Hz frequency represents 60 cycles per second of applied power to poles of a motor component. In at least one embodiment, a frequency changes a rotations per minute (RPM) of a motor component. In at least one embodiment, 60 Hz may correspond to 3600 RPM but a size of a motor component, a number of poles, and other factors may determine its actual RPM.

In at least one embodiment, a control unit 104 can provide power to a VFD 406A; 456A, along with input to enable a speed (in RPM) or a frequency of operation of a VFD. In at least one embodiment, applied power to a VFD is converted to DC power using rectifiers or converters. In at least one embodiment, smoothed DC power, by filtering capacitors, may be provided to transistors functioning as an inverter that may constantly switch the smoothed DC power to a Pulse Width Modulated (PWM) output. In at least one embodiment, the PMW output is according to a determined frequency or speed for a motor. In at least one embodiment, PWM output includes a proper voltage and associated current to control a 3-phase motor represented by motor components of electric motors 406; 456.

Figure 4A:
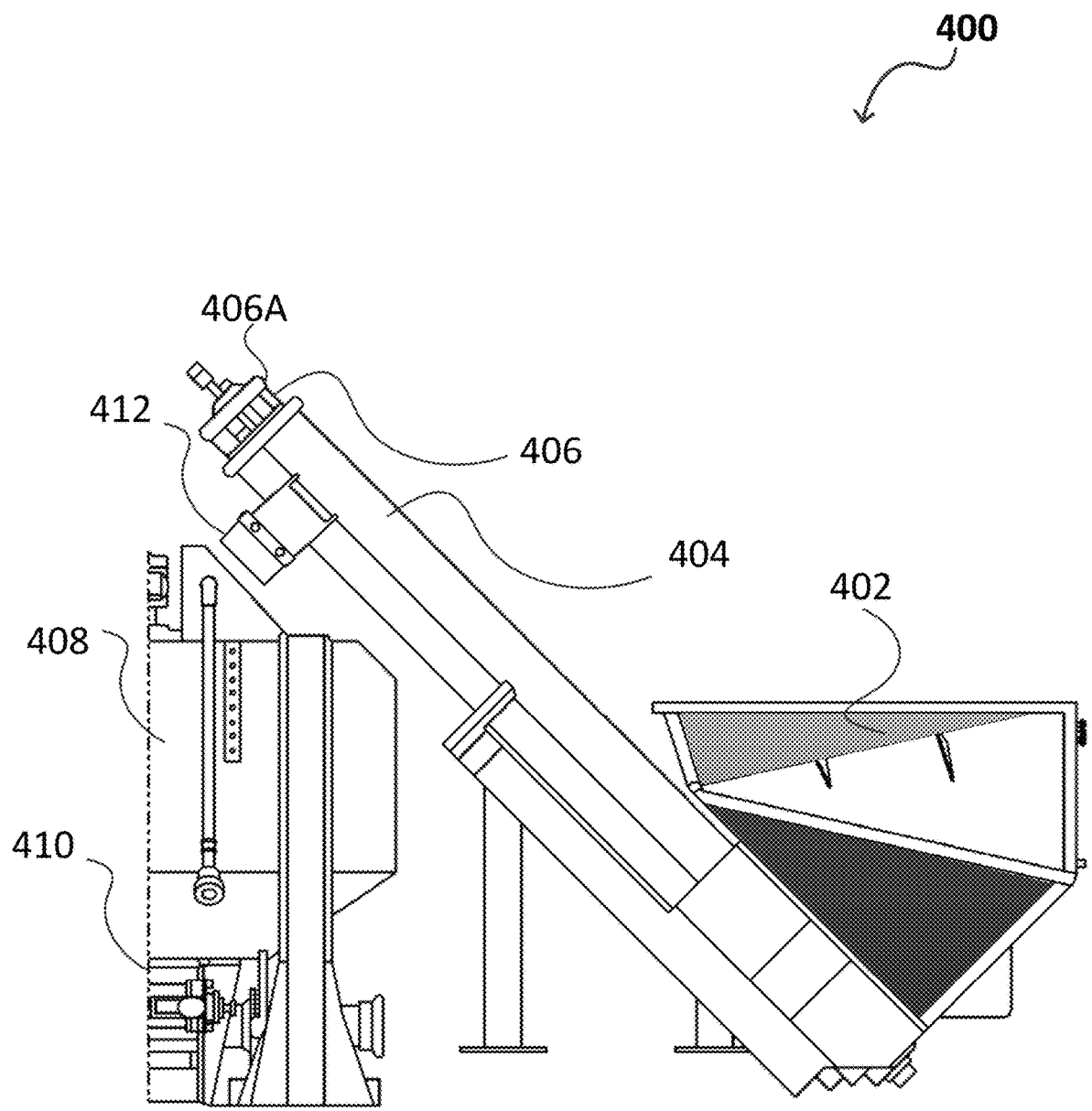
FIGS. 4A, 4B, 4C, 4D, and 4E illustrate a system in various views with further detail of one or more augers working in concert by operation of one or more electric motors to feed a blender tub from at least a hopper, in accordance with at least one embodiment herein.
Figure 4B:
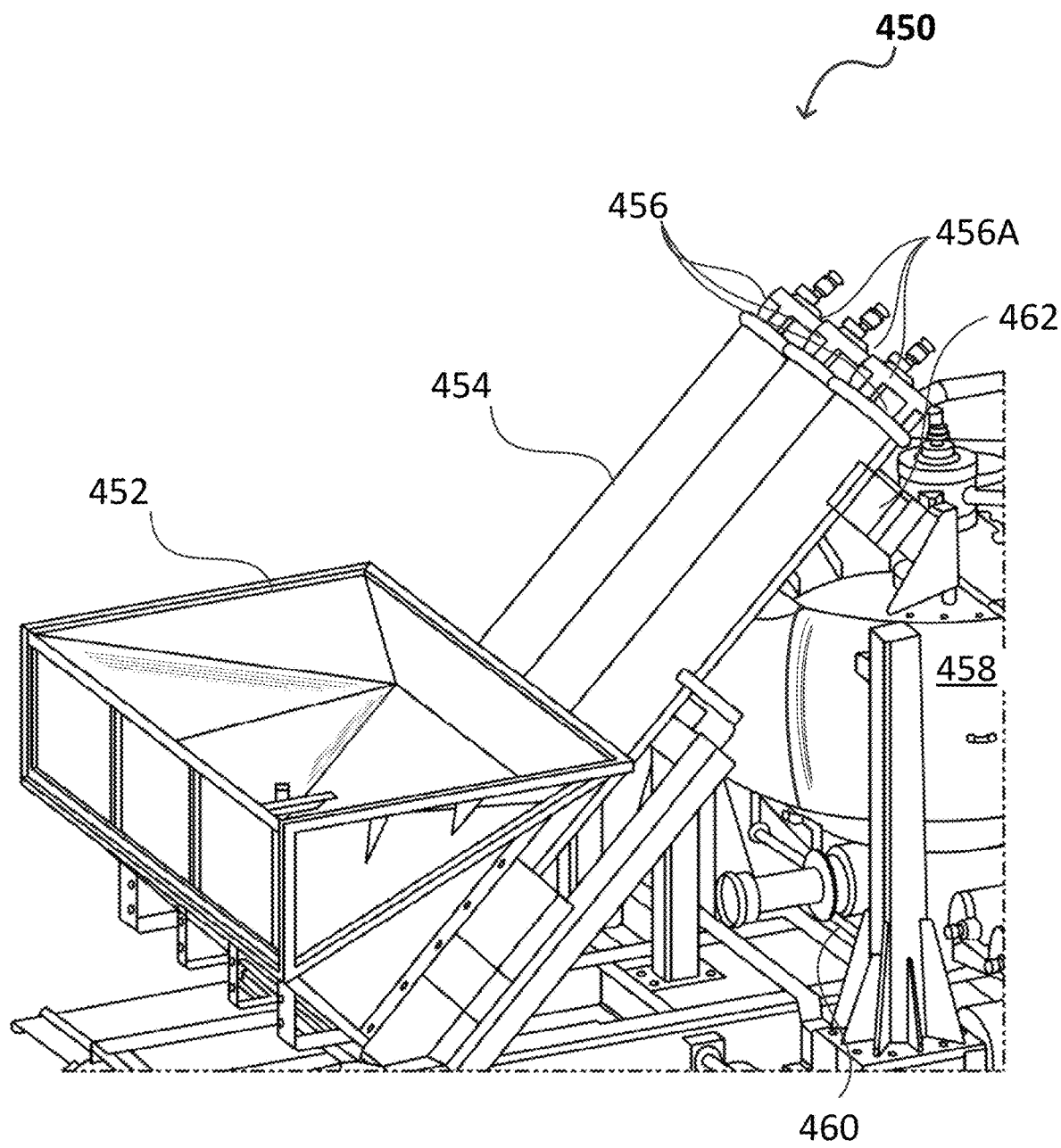
Figure 4C:
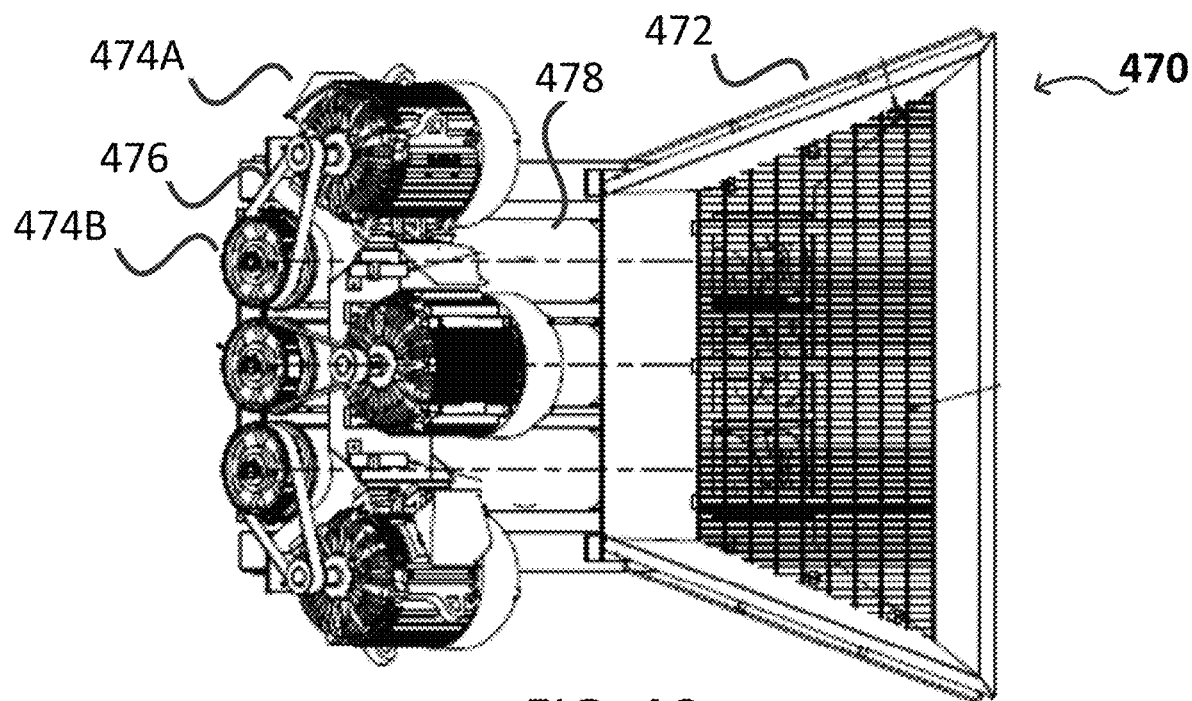

In at least one embodiment, FIG. 4C illustrates a top view of a system 470 (such as a top view of system 400; 450 of FIGS. 4A, 4B) for VFD associated-control with an electric motor and a control unit that supports real-time control of a speed associated with the at least one transportation mechanism. In at least one embodiment, a proppant hopper 472 has associated at least one transportation mechanism 478 that may be a series of enclosed augers. In at least one embodiment, a series of enclosed augers 478 is provided to transport blending components from a proppant hopper 472, which may be a first tub, to a second tub located remotely from the first tub. In at least one embodiment, a second tub receiving proppant from a proppant hopper 472 may use the proppant to enable blending operations.

In at least one embodiment, at least one electric motor 474A may be provided with an associated control unit and with at least one transportation mechanism. In at least one embodiment, at least one VFD may be associated with the electric motor and the control unit. In at least one embodiment, at least one VFD is within a casing of at least one electric motor 474A. In at least one embodiment, a series of three electric motors having respective VFDs or a singular VFD may be provided to operate three transportation mechanism. In at least one embodiment, each electric motor may be coupled to a transportation mechanism via one or more of: a direct drive coupling, a belt driven coupling with augers, or a gear driven coupling. As such, in at least one embodiment, at least one transportation mechanism is associated with or includes a direct drive coupling, a belt driven coupling with augers, or a gear driven coupling.

In at least one embodiment, FIG. 4C illustrates a belt driven coupling between a pulley 474B and a drive shaft or governor of an electric motor 474A. In at least one embodiment, a pulley 474B is attached to an auger causing movement of a transportation mechanism to move proppant. In at least one embodiment, when a drive shaft or governor is enabled to directly move an auger then direct coupling is enabled. In at least one embodiment, when gears, instead of a belt 476, is used between a drive shaft or governor, and a pulley of an auger, then gear driven coupling is enabled. In at least one embodiment, at least one VFD of an electric motor 474A enables real-time control of a speed associated with the at least one transportation mechanism 478.

Figure 4D:
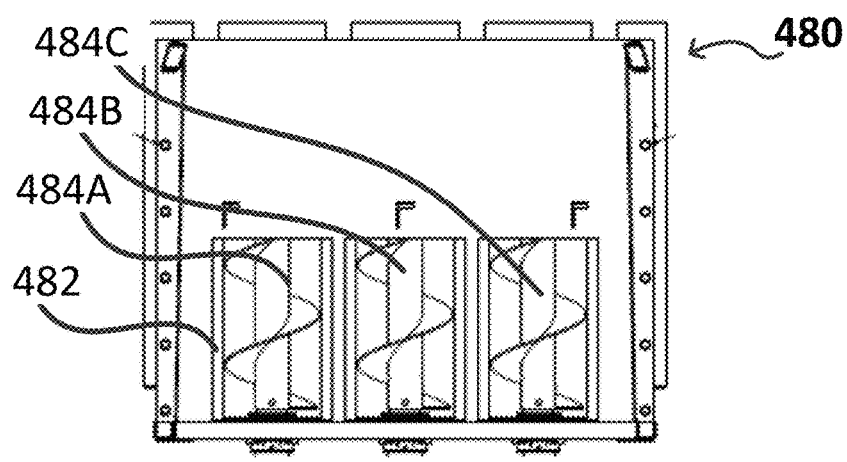

In at least one embodiment, FIG. 4D illustrates a top view of an auger section 480, such as of augers 454 in FIG. 4B. In at least one embodiment, an auger section 480 has three augers 484A-C, each within its own or a shared casing 482. In at least one embodiment, each auger 484A, 484B, 484C, is operated by an electric motor 474A and associated VFD. In at least one embodiment, VFDs and electric motors are controlled via input from a control unit, as discussed in reference to FIGS. 1-4B.

Figure 4E:
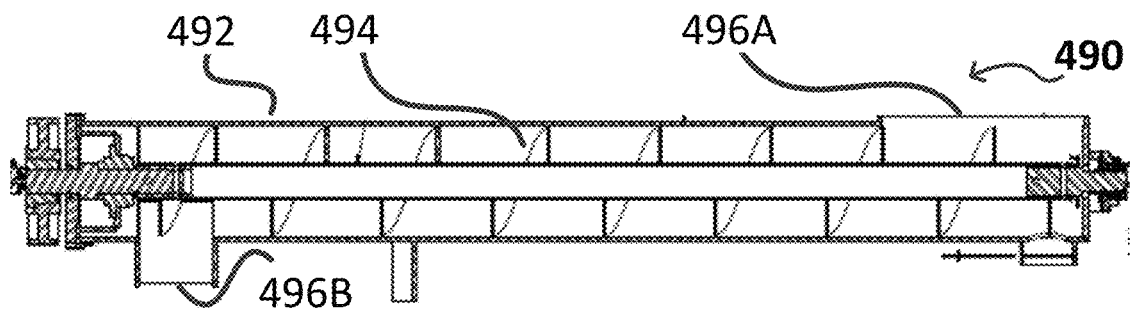

In at least one embodiment, FIG. 4E illustrates a system 490 of an auger 494 within a casing 492 for moving proppant via intake 496A and outlet 496B. In at least one embodiment, a pulley or a gear (or set of pulleys or set of gears) may be associated with one end of an auger 494. In at least one embodiment, at least one auger 494 is operated by an electric motor associated with a pulley, a gear, or directly with a shaft of the at least one auger 494. In at least one embodiment, an intake 496A portion of an auger or its casing may be placed within or associated with a proppant hopper, and an outlet 496B portion of an auger or its casing may be placed within or associated with a blender tub.

Figure 5:
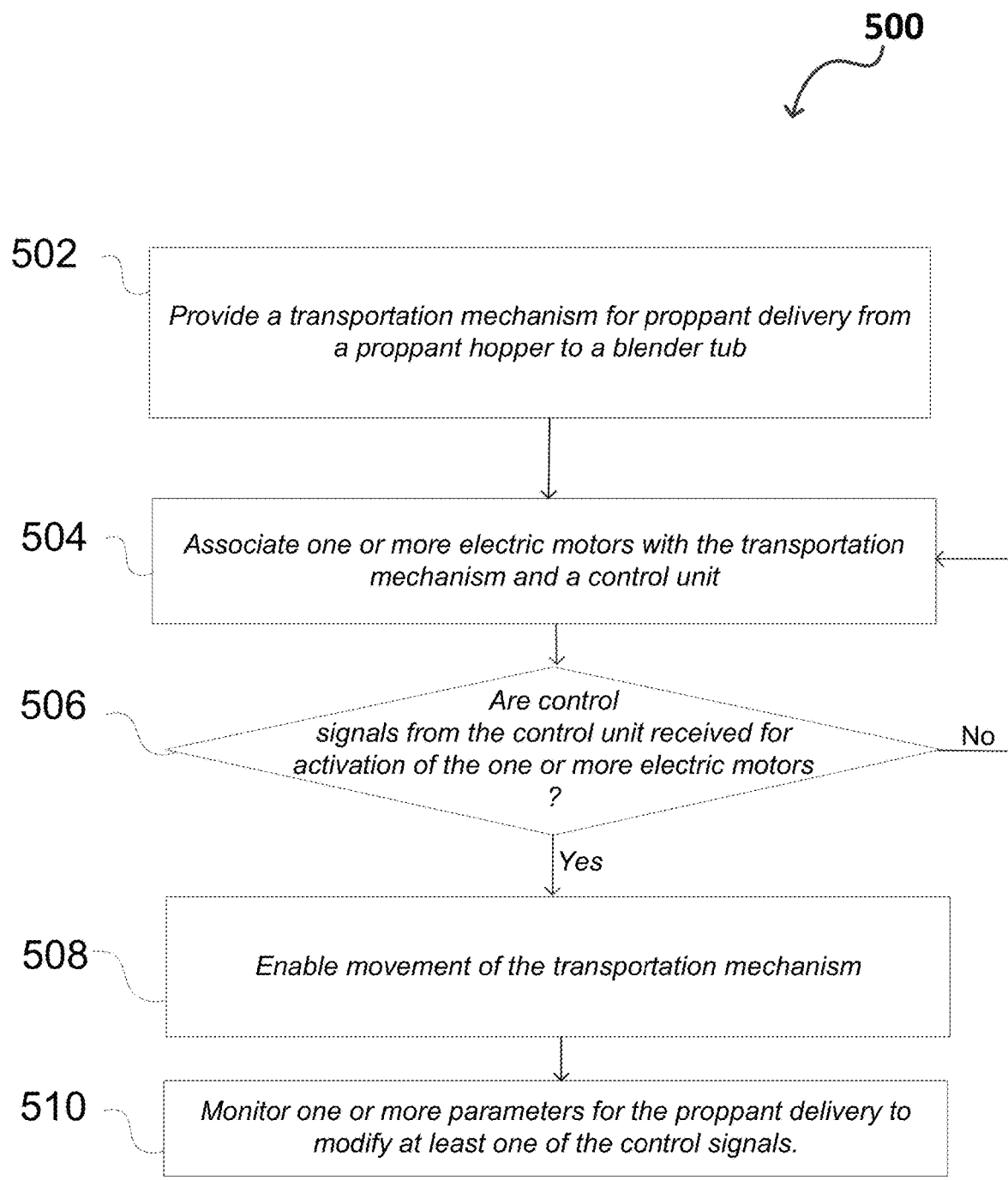
FIG. 5 illustrates a method for manufacture and/or use of an electric-motor driven transportation mechanism in blending for fracturing applications, in accordance with at least one embodiment herein.

FIG. 5 illustrates a method 500 for manufacture and/or for use of an electric-motor driven transportation mechanism in fracturing blender applications in accordance with at least one embodiment of the present disclosure. In at least one embodiment, a method 500 includes providing a system for electric-motor driven transportation mechanism in a fracturing blender. In at least one embodiment, a method 500 includes providing a transportation mechanism, as part of sub-process 502 of the system, to transport proppants or components for a blender fluid from a first tub that may be a proppant hopper to a second tub that may be a blender tub of a fracturing blender. In at least one embodiment, sub-process 502 may be performed by associating at least one transportation mechanism with a first tub and a second tub, so that the at least one transportation mechanism is enabled to transport blending components from the first tub to the second tub for enabling blending operations.

In at least one embodiment, sub-process 504 associates one or more electric motors with the transportation mechanism and a control unit. In at least one embodiment, this may be by coupling mechanical aspects of one or more electric motors with mechanical aspects of a transportation mechanism, and by coupling electrical aspects of one or more electric motors with corresponding electrical aspects of a control unit. In at least one embodiment, sub-process 504 may be understood to enable an electric motor and a control unit to cause movement associated with at least one transportation mechanism.

In at least one embodiment, coupling of mechanical aspects of one or more electric motors and of a transportation mechanism includes such enabling features as providing direct drive coupling, belt driven coupling with augers, and gear driven coupling, as required to cause movement associated with at least one transportation mechanism. In at least one embodiment, direct drive coupling refers to a motor having its shaft coupled to a transportation mechanism, such as via its shaft coupled to a pulley moving augers or moving a conveyor belt. In at least one embodiment, belt driver coupling may be an indirect coupling between a shaft and multiple drive pulleys that moves augers with a belt therebetween. In at least one embodiment, gear driven coupling may be enabled by one or more gears that are caused to move by action of an electric motor and thereby cause movement of a shaft associated augers or a conveyor belt having a pulleys.

In at least one embodiment, sub-process 504 may further include associating at least one variable frequency drive (VFD) with an electric motor and a control unit to cause movement associated with the at least one transportation mechanism. In at least one embodiment, one or more VFDs may be provided within or associated with electric motors for real-time control of a speed associated with a transportation mechanism by control signals from the control unit. In at least one embodiment, sub-process 506 determines that control signals from a control unit are received for activation of one or more electric motors. In at least one embodiment, such a determination may be supported by power input received to a VFD, along with any associated signal that may be indicative of a speed or frequency intended for a motor component.

In at least one embodiment, when control signals are received, a movement of the transportation mechanism may be enabled by a VFD power provided to mechanical aspects of one or more electric motors coupled to a transportation mechanism. One or more parameters of proppant delivery may be monitored in sub-process 510. In an aspect, sub-process 510 may receive and process input from one or more sensors used to detect levels of proppant in the hopper 402; 452; to detect an auger speed of one or more augers 404; 454, and a proppant size. From this information, a speed of a transportation mechanism may be controlled to avoid overfilling and underfilling of a blender tub and to avoid damage to a transportation mechanism, in at least one embodiment. As such, in at least one embodiment, control signals previously provided may be modified from a control unit, via sub-process 510. In at least one embodiment, this sub-process 510 may represent a feature that uses at least one VFD enabled to provide real-time control of a speed associated with movement caused in at least one transportation mechanism. In at least one embodiment, a VFD provides voltage, current, and frequency modulated power to a motor component. In at least one embodiment, a combination of voltage, current, and frequency enable real-time control of a speed associated with movement caused in at least one transportation mechanism.

Various embodiments can be implemented in a wide variety of operating environments and a control unit for the transportation mechanism or the system can include one or more user computers, computing devices, or processing devices which can be used to operate any of a number of applications. User or client devices for a control section or control unit described throughout herein can include any of a number of personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network. In at least one embodiment, user or client devices include man-machine interfaces to communicate control from a control unit to a VFD for an electric motor.

Various aspects also can be implemented as part of at least one service or Web service, such as may be part of a service-oriented architecture for external communication of the results, for example. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Some embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

A client environment may be developed in the mobile unit (and pertinently in a control section including a control unit for a VFD) to include a variety of databases and other memory and storage media as discussed above. These can alternatively reside in a variety of locations, such as on a storage medium local to (and/or resident in) one or more of the computers or remote from any or all of the computers across the network. In aspects of the present disclosure, information from the present system may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above.

For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments. Additionally, if a particular decision or action is described as being made or performed "based on" a condition or piece of information, this should not be interpreted as that decision or action being made or performed exclusively based on that condition or piece of information, unless explicitly so stated.

The specification and drawings are, accordingly, to be regarded in an illustrative rather than a restrictive sense. It will, however, be evident that various modifications and changes may be made thereunto without departing from the broader spirit and scope of the invention as set described herein.

What is claimed is:

1. A fracturing system comprising at least one transportation mechanism to transport blending components from a first tub to a second tub through chutes that are provided in side areas between the first tub and the second tub and that comprises the at least one transportation mechanism, wherein the at least one transportation mechanism is subject to real-time control of a frequency or speed based in part on input from at least one variable frequency drive (VFD) to an electric motor and a control unit that is associated with the at least one transportation mechanism.

2. The fracturing system of claim 1, wherein the at least one transportation mechanism is associated with or comprises a direct drive coupling, a belt driven coupling with augers, or a gear driven coupling.

3. The system of claim 1, further comprising:
a mobile unit comprising the at least one VFD and the electric motor, wherein the at least one VFD is also adapted to be controlled by the control unit.

4. The fracturing system of claim 1, further comprising: two transportation mechanisms, a first one of the two transportation mechanisms aligned in a first angle with respect to a bottom of the first tub and a second one of the two transportation mechanisms in a second angle with respect to the first angle of the first one of the two transportation mechanisms.

5. The fracturing system of claim 1, further comprising:
a conveyer belt system or an auger system to function as part of the at least one transportation mechanism, the conveyer belt system or the auger system comprising buckets, paddles, or scoops to transport the blending components.

6. The fracturing system of claim 1, further comprising:
at least one vehicle or trailer of a fracturing fleet comprising thereon one or more of the first tub or the second tub, and comprising thereon the electric motor, the control unit, and the at least one VFD to support blending operations performed on the at least one vehicle or trailer.

7. The fracturing system of claim 1, wherein the at least one transportation mechanism is movable into the first tub to access the blending components.

8. The fracturing system of claim 1, wherein the at least one transportation mechanism comprises at least one base transportation mechanism to displace the blending components towards at least one side transportation mechanism of the at least one transportation mechanism, the at least one side transportation mechanism to move the blending components from the first tub to the second tub using the chutes.

9. The fracturing system of claim 1, further comprising:
one or more second electric motors, the one or more second electric motors and the electric motor to function in a synchronous operation, wherein the one or more second electric motors is associated with multiple transportation mechanisms, and wherein the blending components are continuously moving and are devoid of accumulation in any areas within at least the first tub.

10. The fracturing system of claim 1, further comprising:
a mobile unit to comprise the control unit as remotely located thereon, relative to the electric motor, to control the at least one VFD for the electric motor.

11. A method comprising:
providing a fracturing system which comprises at least one transportation mechanism to transport blending components from a first tub to a second tub through chutes that are provided in side areas between the first tub and the second tub and that comprises the at least one transportation mechanism; and
providing real-time control of a frequency or speed for the at least one transportation mechanism based in part on input from at least one variable frequency drive (VFD) to an electric motor and a control unit that is associated with the at least one transportation mechanism.

12. The method of claim 11, further comprising:
associating the at least one transportation mechanism within the chutes; locating the second tub within the first tub;
enabling at least part of the at least one transportation mechanism to move the blending components to the side areas; and
associating the at least one variable frequency drive (VFD) with the electric motor, the control unit, and at least one transportation mechanism.

13. The method of claim 11, wherein the at least one transportation mechanism is associated with or comprises a direct drive coupling, a belt driven coupling with augers, or a gear driven coupling.

14. The method of claim 11, further comprising:
locating the at least one VFD and the electric motor on a mobile unit; and
adapting the at least one VFD to be controlled by the control unit.

15. The method of claim 11, further comprising:
providing a first transportation mechanism of the at least one transportation mechanism to be aligned in a first angle with respect to a bottom of the first tub; and providing a second transportation mechanism of the at least one transportation mechanism to be aligned in a second angle with respect to the first angle of the first transportation mechanism.

16. The method of claim 11, further comprising:

enabling a conveyer belt system or an auger system to function as part of the at least one transportation mechanism; and enabling buckets, paddles, or scoops on the conveyer belt system or the auger system to transport the blending components.

17. The method of claim 11, further comprising:

providing the electric motor, the control unit, the at least one VFD and one or more of the first tub or the second tub on at least one vehicle or trailer of a fracturing fleet; and performing blending operations for the blending components on the at least one vehicle or trailer.

18. The method of claim 11, further comprising:

enabling movement of the at least one transportation mechanism into the first tub to access the blending components.

19. The method of claim 11, further comprising:

displacing, using at least one base transportation mechanism of the at least one transportation mechanism, the blending components towards side transportation mechanisms of the at least one transportation mechanism comprising; and moving, using the side transportation mechanisms, the blending components from the first tub to the second tub using the chutes.

20. The method of claim 11, further comprising:

associating the electric motor and one or more second electric motors with multiple transportation mechanisms of the at least one transportation mechanism; and synchronously operating the electric motor and the one or more second electric motors to cause the blending components to be continuously moving and to be devoid of accumulation in any areas within at least the first tub.

* * * * *